United States Patent [19]

Hogan et al.

[11] Patent Number: 5,646,982

[45] Date of Patent: Jul. 8, 1997

[54] SYSTEM AND METHOD FOR MESSAGE DELIVERY

[75] Inventors: Steven J. Hogan; Kristi T. Feltz; Douglas R. Murdock, all of Cedar Rapids; Roy A. Rhodes, Marion; Keith E. Smith; Todd A. Goodman, both of Cedar Rapids, all of Iowa

[73] Assignee: LinkUSA Corporation, Cedar Rapids, Iowa

[21] Appl. No.: 366,559

[22] Filed: Dec. 30, 1994

[51] Int. Cl.⁶ .............................. H04M 1/64; H04M 3/42

[52] U.S. Cl. ................... 379/89; 379/67; 379/79; 379/84; 379/207

[58] Field of Search .......................... 379/67, 88, 89, 379/79, 84, 201, 207; 370/61, 60

[56] References Cited

U.S. PATENT DOCUMENTS

| | | | |
|---|---|---|---|
| 4,580,012 | 4/1986 | Matthews et al. | 379/89 X |
| 4,625,081 | 11/1986 | Lotito et al. | 379/88 |
| 4,891,835 | 1/1990 | Leung et al. | 379/88 |
| 4,935,954 | 6/1990 | Thompson et al. | 379/89 |
| 4,972,461 | 11/1990 | Brown et al. | 379/89 |
| 5,029,200 | 7/1991 | Haas et al. | 379/89 |
| 5,033,077 | 7/1991 | Bergeron et al. | 379/89 |
| 5,153,905 | 10/1992 | Bergeron et al. | 379/89 |
| 5,222,120 | 6/1993 | McLeod et al. | 379/88 |
| 5,247,568 | 9/1993 | Bergsman et al. | 379/89 |
| 5,260,986 | 11/1993 | Pershan | 379/88 |
| 5,260,990 | 11/1993 | McLamey et al. | 379/89 |
| 5,333,180 | 7/1994 | Brown et al. | 379/67 |
| 5,359,645 | 10/1994 | Katz | 379/93 |
| 5,367,609 | 11/1994 | Hopper et al. | 395/2.87 |
| 5,384,829 | 1/1995 | Heileman, Jr. et al. | 379/67 |
| 5,477,541 | 12/1995 | White et al. | 370/94.1 |

FOREIGN PATENT DOCUMENTS

WO91/16779  10/1991  WIPO.

*Primary Examiner*—Krista M. Zele
*Assistant Examiner*—Harry S. Hong
*Attorney, Agent, or Firm*—Sterne, Kessler, Goldstein & Fox P.L.L.C.

[57] ABSTRACT

A message delivery sequence coordinates the scheduling and delivery of messages. When a user desires to send a message, the user contacts the message delivery system. An automated voice response unit prompts the user for message delivery information, including a delivery time and other delivery options and also prompts the user for the message itself. The message is stored in a message database and an access record corresponding to the message and containing message delivery information is stored in an access database. A delivery time is determined for the message and an event is stored in a scheduling database indicating the delivery time. At the scheduled delivery time, the message delivery system instructs a network control processor to start delivery of the message. The network control processor notifies the automated voice response unit that the message is to be delivered. The network control processor originates a call to the recipient and informs the automated voice response unit when the recipient answers. The automated voice response unit retrieves the message from the message database and initiates delivery of the message to the recipient.

20 Claims, 29 Drawing Sheets

| FIG 20 |
|---|
| FIG 21 |
| FIG 22 |
| FIG 23 |
| FIG 24 |

FIG 19

SCHEDULING INFORMATION STRUCTURE 2500

SYSTEM AND METHOD FOR MESSAGE DELIVERY

RELATED APPLICATIONS

This application is related to commonly owned applications titled: "Call Processing System and Method," Ser. No. 08/136,211, and filed on Oct. 15, 1993, now U.S. Pat. No. 5,590,181; "System and Method for Call Conferencing" Ser. No. 08/257,622, and filed on Jun. 8, 1994 now U.S. Pat. No. 5,483,587; and "Distributed Voice System and Method" Ser. No. 08/257,623, and filed on Jun. 8, 1994; the full disclosures of which are incorporated herein by reference as if reproduced in full below.

BACKGROUND OF THE INVENTION

1. Field of the Invention

The present invention relates generally to call processing systems, and more specifically to a system and method for recording, scheduling and delivering messages.

2. Related Art

With the growth of processor technology came the application of processor-based systems in the telephone industry. The functionality of call processing systems grew exponentially with the introduction of processor-based systems. One area of expanded functionality is in enhanced calling features. One such feature is voice and data message delivery.

An early voice messaging system still in use today is the telephone answering service. In such a service, one or more operators are enlisted to handle the telephone traffic of the service's clients. The operators answer the clients' incoming calls and take messages and orders for the client or otherwise provide information to the caller. Each operator is positioned at an operator station having several incoming lines. When a call comes in on one of the lines, the operator answers the call. In most cases, the operator provides an appropriate greeting to the caller, identifying the service's client to whom the call is placed. The operator can then proceed to take a message for the client, take an order for the client's goods or services, or otherwise provide information to the caller about the client.

Improvements to the telephone answering service have been implemented in recent years. In some systems, the operators are provided with semi-automated consoles that identify the incoming line to be answered and provide client information to the operator on a display screen. The message received can be keyed in to the console and stored until the client calls the service to retrieve his or her messages. Such a system, however, still provides limited flexibility in processing clients' calls. Human operator intervention is required and there are limited options as far as message handling and delivery.

Another message system provides voice mailboxes that store messages for the called party. The stored messages are delivered when the called party accesses his or her voice mailbox. While such a system avoids the need for human operator intervention, the flexibility and features provided by voice mailboxes are not much greater than that provided by the average in-home answering machine.

SUMMARY OF THE INVENTION

The present invention is directed to a system and method for recording, scheduling for delivery, and delivering messages. According to the invention, a message delivery service is provided that coordinates the recording, scheduling and delivery of messages received from one user and intended for another.

The message delivery service includes a message delivery system interfaced to a call processing system. The message delivery system includes a message delivery controller, a scheduler, and data storage area for storing messages to be delivered, message information, and delivery schedule information. The message delivery controller determines the delivery schedule and communicates with the call processing system to coordinate message delivery. An automated voice response unit in the call processing system interfaces with the sending user, stores the message in the message delivery system, and retrieves the message for delivery to the recipient.

When a call is received from a first user who is leaving a message for a second user, the automated voice response unit queries the first user for message delivery information and other message options, as well as for the actual message itself. The automated voice response unit stores the message in a message database and creates an access record for the message. The access record can include all relevant information regarding the message such as the destination telephone number, the time at which the message was recorded, message keys identifying data in the message database, and a scheduler ID. The access record is stored in an access database and identified by an access key.

With the message information recorded, the message is scheduled for delivery. The user can request delivery at a specified date and time, or upon the passage of a determined amount of time. The user also can specify the number of retry attempts where delivery is unsuccessful and the amount of time to wait between retry attempts. A message delivery system performs a time calculation to determine when to start the first delivery attempt. The message is scheduled for delivery and a schedule event is stored in a scheduler database, the schedule event indicating that the delivery of the message is to be initiated at a specified date and time.

At the scheduled delivery time, the message delivery system informs the network control processor that a message is to be sent. The automated voice response unit retrieves the access record for the message and instructs the network control processor to originate a call to the message recipient. The automated voice response unit retrieves the message from the message database service and delivers the message to the recipient. Once the message is delivered, it can be deleted from the message database.

If delivery is unsuccessful, one or more retry attempts can be made. Associated with the message is information pertaining to the number of retry attempts and the amount of time to wait between retries. The message delivery system determines whether a retry attempt is to be made, and if so, schedules the attempt. At the scheduled time, the message delivery is attempted again.

One advantage of the message delivery system is that it provides for message storage, scheduling and delivery without the need for human operator intervention. The entire process of message storage, scheduling and delivery is fully automated. When a user calls to place a message, the call is handled entirely by the automated voice response unit. The automated voice response unit answers the user's call, queries the user for information pertaining to the message and its delivery and scheduling and queries the user for the message itself. The automated voice response unit records the message and informs the message delivery system that the message is to be scheduled for delivery. At the scheduled delivery time, the system automatically initiates a call to the recipient, introduces the message, and delivers the message to the recipient.

Another advantage of the invention is that communications to the sending and recipient users are made using automated scripts sent via the automated voice response unit. The scripts prompt the user for required information and provide the user with menus from which input choices can be selected. Scripts also provide dialogue to the recipient when the message is delivered. The scripts can be customized at the user, subscriber, and/or customer level. Such customization allows the system to provide, for example, carrier unique greetings, customized message handling features, and other custom user interfaces. To accomplish this, scripts can be recorded and played based on call data such as the caller's ID, the caller's carrier ID, the recipient's ID, and other like information.

Another advantage of the invention is that message handling can be customized at the user, subscriber and/or customer level. One way this is accomplished is through the use of DEF records. DEF records provide instructions to the automated voice response unit on how to process the message recording, scheduling, and delivery. The DEF records can be customized at the user, subscriber and/or customer level so that different users, or users of different carriers, are provided with different message delivery features.

Another advantage of the invention is that it maximizes message storage by allowing different types of data to be stored in the same device using the same message delivery service. The message delivery service does not care whether the message to be stored and delivered is a voice message, a data message, a facsimile, or other message type. This provides the further advantage of eliminating machine-dependent recording, storage and delivery.

Further features and advantages of the present invention, as well as the structure and operation of various embodiments of the present invention, are described in detail below with reference to the accompanying drawings.

BRIEF DESCRIPTION OF THE DRAWINGS

The present invention is described with reference to the accompanying drawings. In the drawings, like reference numbers indicate identical or functionally similar elements. Additionally, the left-most digit(s) of a reference number identifies the drawing in which the reference number first appears.

FIG. 7 is a high-level operational flow diagram illustrating the process that the call processing system uses to process operator-assisted calls.

FIG. 8, which is a continuation of FIG. 7, illustrates a high-level operational flow of the process that the call processing system uses to process operator-assisted calls.

FIG. 12, which comprises

FIG. 13, is an operational flow diagram that details a process for storing and recording messages according to one embodiment of the invention.

FIG. 14, which is a continuation of FIG. 13, is an operational flow diagram that details a process for storing and recording messages according to one embodiment of the invention.

FIG. 15, which is a continuation of FIG. 14, is an operational flow diagram that details a process for storing and recording messages according to one embodiment of the invention.

FIG. 19, which comprises

FIG. 20, is an operational flow diagram illustrating a process of message delivery according to one embodiment of the invention.

FIG. 21, which is a continuation of FIG. 20, is an operational flow diagram illustrating a process of message delivery according to one embodiment of the invention.

FIG. 22, which is a continuation of FIG. 21, is an operational flow diagram illustrating a process of message delivery according to one embodiment of the invention.

FIG. 23, which is a continuation of FIG. 22, is an operational flow diagram illustrating a process of message delivery according to one embodiment of the invention.

FIG. 24, which is a continuation of FIG. 22, is an operational flow diagram illustrating a process of message delivery according to one embodiment of the invention.

DETAILED DESCRIPTION OF THE EMBODIMENTS

1. Overview and Discussion of the Invention

The present invention is directed toward a system and method for message delivery. The messaging system operates in the environment of a call processing system. In order to provide the reader with a more complete understanding of the invention, two call processing systems are first described. In Section 1.1, a standard call processing is described. Section 1.2 describes an enhanced call processing system that utilizes a network control processor (NCP) 304 (illustrated in FIG. 3) to provide enhanced call processing features.

1.1 Standard Call Processing System

Figure 1:
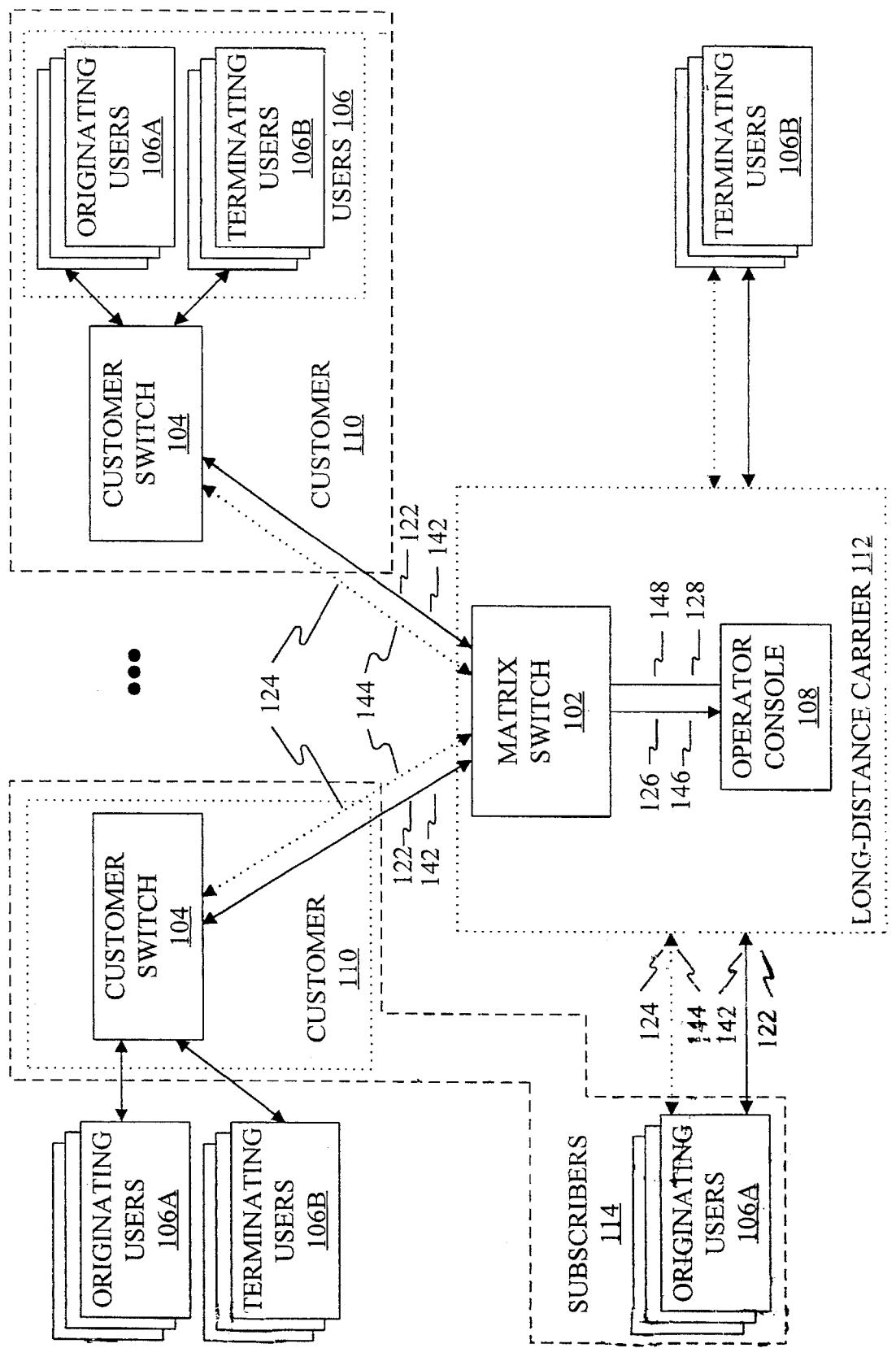
FIG. 1 is a high-level block diagram illustrating the architecture of a conventional telephone switching configuration.

An example of a conventional telephone switching configuration is illustrated in FIG. 1. FIG. 1 is a high-level block diagram illustrating the architecture of a conventional telephone switching configuration. Referring now to FIG. 1, the configuration includes a matrix switch 102 and an operator console 108. A typical subscriber 114 to a long-distance carrier 112 may be a business, another carrier, or an individual user 106. Customer 110 may, for example, be a business or it may be a carrier that is procuring enhanced services from a competitor long-distance carrier 112. Customer 110 may have its own customer switch 104 for routing calls between outside trunks and inside lines or instruments.

Users 106 (for example, humans talking on the telephone) place long-distance calls using long-distance carrier 112. The user 106 who places the call (calling party) is termed an originating user 106A. The user 106 to whom the call is placed (called party) is termed a terminating user 106B.

Originating user 106A may place the call directly with long-distance carrier 112 where originating user 106A is a customer of long-distance carrier 112. Where originating user 106A subscribes to another carrier that is a customer 110 of long-distance carrier 112, the call is muted through customer 110. Where originating user 106A is an end-user at a business that is a customer 110 of long-distance carrier 112 and that has its own switch 104, that originating user's call also gets routed through customer switch 104. In the latter two cases, originating user 106A is deemed a "client" of customer 110.

Matrix switch 102 is provided as a switch to route calls between users 106. A call is routed from originating user 106A to terminating user 106B. Matrix switch 102 typically can route thousands of telephone calls simultaneously. An example of matrix switch 102 is the commercially-available switch model DMS 250, manufactured by Northern Telecom, Inc. in Richardson, Tex., USA. "DMS" is a registered trademark of Northern Telecom, Inc.

Figure 2:
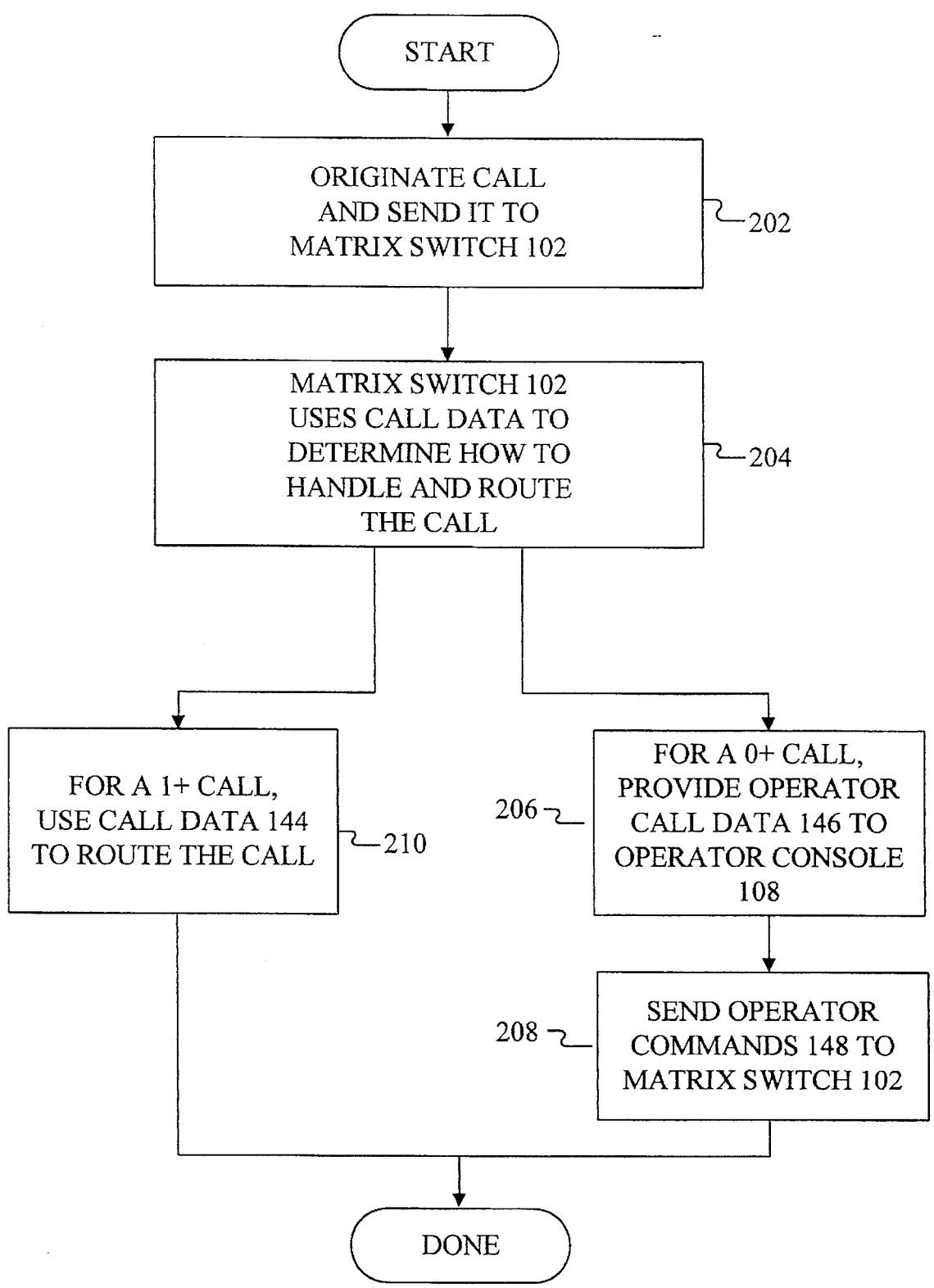
FIG. 2 is a high-level operational flow diagram illustrating the manner in which a conventional long-distance carrier provides long-distance telephone services to a long-distance carrier customer.

The manner in which long-distance carrier 112 provides long-distance services is now described. FIG. 2 is a high-level operational flow diagram illustrating the manner in which long-distance carrier 112 provides long-distance telephone services to its subscribers 114. FIGS. 1 and 2 are now referred to in order to illustrate how long-distance carrier 112 provides direct-dial long-distance service and operator-assisted calling for users 106. Long-distance direct dialing is accomplished by dialing one plus (1+) the called number. Operator-assisted calling can be placed by dialing zero plus (0+) the called number or by simply dialing zero (0).

The long-distance call is originated by user 106 and sent to matrix switch 102. This occurs in a step 202. The call is sent over two channels. These channels are an audio channel 122 and a signalling channel 124. Audio channel 122 carries the audio portion of the call. The audio portion of the call is referred to as call audio 142. It is over audio channel 122 that the caller's voice (in other words, call audio 142) can be heard. Call audio 142 can be analog audio, digital audio, or other information transferred among users 106 in analog or digital form (for example, fax or modem signals).

Signalling channel 124 is used to transmit call data 144. Call data 144 includes information regarding the type of telephone call being made and other call handling parameters including called number, originating number (e.g., an automatic number identification, or AND, how the call was dialed (1+, 0+, 0), and the like. Call data 144 also provides call setup parameters to matrix switch 102.

An example of a signalling channel 124 is the industry standard common channel signalling system 7 (SS7) out-of-band signalling channel. SS7 is typically a 56 kilobit (kbit) link, and is commonly transmitted over a T-1 carrier. Typically, call data 144 is a data packet comprising 30–40 bytes of data.

Matrix switch 102 accepts call data 144 to determine how to handle and route the call. This occurs in a step 204.

If the call requires operator assistance (for example, a collect call), operator call data 146 is provided to an operator console 108. This occurs in a step 206. Typically, operator call data 146 is transferred to operator console 108 over a data link 126. Operator call data 146 includes information regarding the type of call and other information which matrix switch 102 knows regarding the call such as originating number, how the call was dialed, and the like.

Operator console 108 is typically a manual operator console which requires a human operator. The human operator answers the incoming call. The human operator then sends operator commands 128 to matrix switch 102 to complete the call so the operator can verify that the called party will accept the charges for the call. This occurs in a step 208.

If the call was instead a direct-dial call, matrix switch 102 uses call data 144 provided over signalling channel 124 to determine where to route the call. Matrix switch 102 then routes the call to the destination number. This occurs in a step 210.

There are several problems associated with this system used by the conventional long distance carrier. First, data link 126 over which operator call data 146 are transferred is often slower than desired and introduces unwanted delays in handling the call.

A second problem is that the human operator at operator console 108 only gets the information that matrix switch 102 decides to send. In other words, call handling is limited to the features and capabilities that are provided by the particular matrix switch 102 that was purchased by the carrier.

Note, other manufacturers may provide matrix switches 102 with different features from those of the DMS 250. For example, other switches 102 may have a higher data rate link 126. However, long-distance carrier 112 is still limited to the choices of matrix switches 102 that are commercially available, because it would be prohibitively expensive to design, develop and manufacture a custom matrix switch 102. Thus, the functionality and capabilities that can be provided by a long distance carrier in this conventional system are limited to the functionality and characteristics provided by available matrix switches 102.

Because matrix switches 102 are costly to develop, they are typically designed to provide only those basic functions that all long-distance carriers are likely to desire. In this manner, the development costs of matrix switch 102 can be spread among numerous long-distance carriers. The cost of developing and manufacturing a unique matrix switch 102 is too high to provide a custom switch for a single long-distance carrier, or for only a small group of long-distance carriers. As a result, customer-unique and carrier-unique calling features and services cannot be provided.

Additionally, most manufacturers of matrix switches 102 are unable to modify existing matrix switches 102 to meet unique needs of the various long-distance carriers without a significant cost and significant time to implement.

An additional problem is that it is typically expensive to provide operator positions to interface to matrix switch 102. This is because operator consoles can only interface to conventional matrix switches 102 via special operator ports. Most conventional matrix switches provide a limited number of such operator ports. For example, the DMS 250 matrix switch 102 provides a capability of 384 operator console ports per switch. Thus, in this example, if more than 384 operator consoles 108 are desired, at least one additional DMS 250 matrix switch must be purchased. At a cost of approximately $2 million per DMS 250 (1993 prices), the cost of additional operator positions is high.

This example serves to illustrate a few drawbacks of conventional call processing systems. Due to the high cost of available matrix switches 102, most, if not all, of the smaller long-distance carders cannot afford to purchase or develop custom telecommunications switching equipment. As a result, these carders cannot have their own operator positions. Therefore, these carriers must obtain high-end services such as operator-assisted calling through carriers 112 who have such capabilities.

Additionally, for those long-distance carriers who do have matrix switches 102, such switches 102 cannot be easily (or cost-effectively) reconfigured, or customized, to meet unique call processing needs. Thus, the flexibility required to offer a wide range of customer services and call handling capabilities cannot be provided to the customers and users of these call processing systems 112.

1.2 Enhanced Call Processing System

Figure 3:
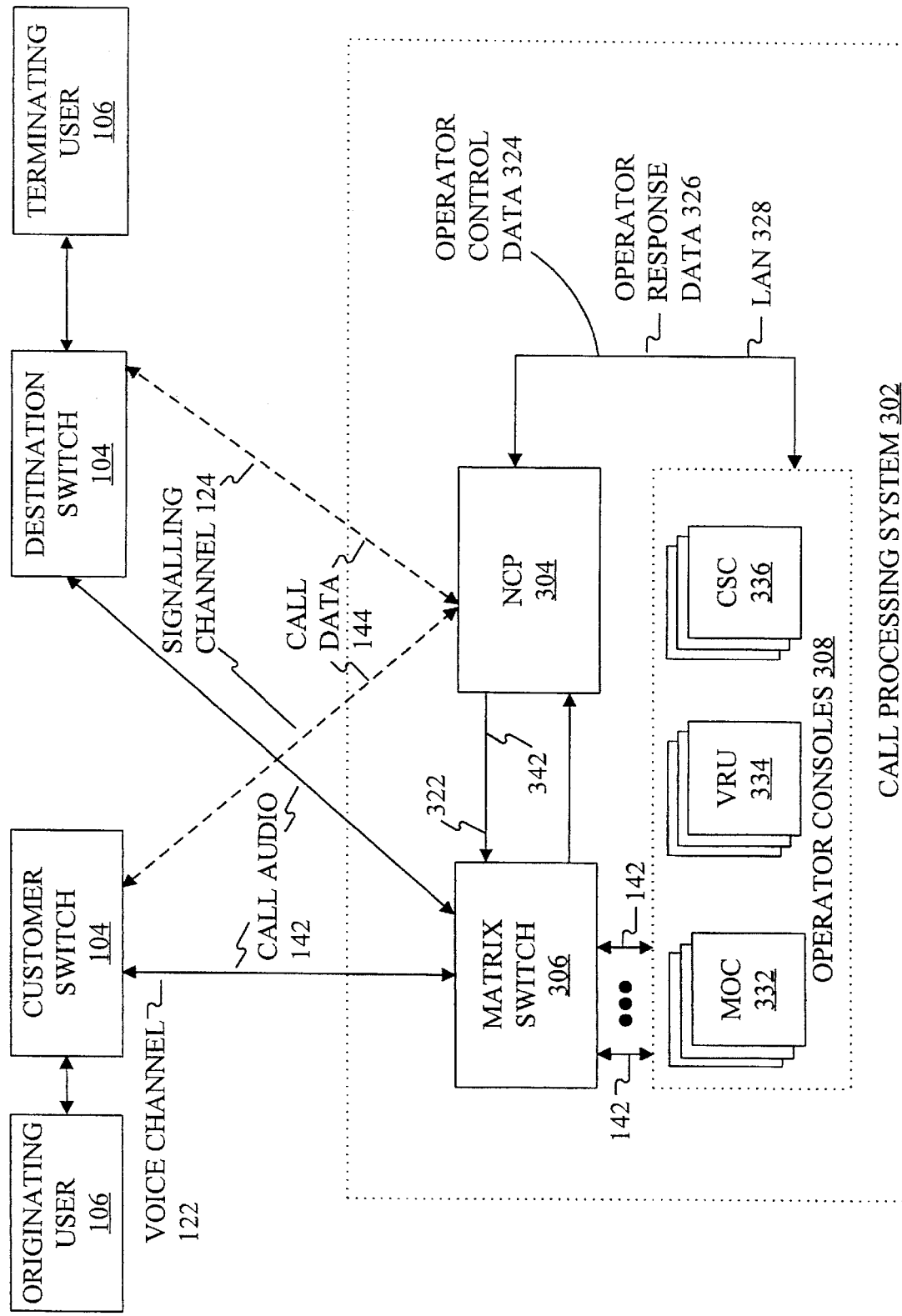
FIG. 3 is a high-level block diagram illustrating a call processing system.

A call processing system can be implemented to overcome the above-discussed limitations of the matrix switch 102 and to provide a flexible call processing system. FIG. 3 provides a high-level illustration of such a call processing system 302.

Call processing system 302 can be implemented to provide a wide range of enhanced calling products and features to carriers and individual users. One or more carriers can use call processing system 302 to obtain carrier-unique and customer-unique, customized products and features for their customers.

Call processing system 302 includes a network control processor (NCP) 304 and a matrix switch 306. Matrix switch 306 could be the same as matrix switch 102 (for example, a DMS 250). Alternatively, matrix switch 306 could be a simpler type of switch as is described below. Network control processor 304 is a unique combination of hardware, software structure and programs designed and developed to control calls being handled by call processing system 302. Network control processor 304, as well as other elements of an enhanced call processing system 302, are fully described in detail in co-pending patent application of common assignee, Ser. No. 08/136,211, which is incorporated herein by reference in its entirety.

Call processing system 302 can also include one or more operator consoles 308. Operator console 308 can be the same as operator console 108 used in the conventional system. However, in a preferred embodiment, operator consoles 308 provide additional features not found in conventional operator consoles 108. For example, operator consoles 308 provide the capability to use customized scripts to present a carrier-unique interface.

Types of operator consoles 308 can include a manual operator console (MOC) 332 and an automated voice response unit (VRU) 334. Manual operator console 332 provides the functionality required for a human operator to converse with the caller. Automated voice response unit 334 does not require a human operator to handle operator-assisted calls. Automated voice response unit 334 includes stored voice responses (automated scripts) to provide automated voice instructions to the caller. For example, automated voice response unit 334 may instruct a caller 106A (originating user) to enter her calling card number.

An additional type of operator console 308 includes a customer service console (CSC) 336. Customer service console 336 performs customer service related functions. These functions include giving credits for call problems and answering questions of users 106 and long-distance carrier customers of call-processing system 302.

When a call is originated by originating user 106A, call audio 142 and call data 144 for the call are muted to call processing system 302. A key feature of call processing system 302 is that it enables call audio 142 on audio channel 122 to be handled separately from call data 144.

Network control processor 304 receives call data 144 via signalling channel 124. Network control processor 304 uses call data 144 to make call handling decisions. Examples of these decisions include whether operator assistance is required, whether a number translation is required, how to bill the call, where the call should be routed, and the like. Also, when the call is originated, matrix switch 306 receives call audio 142 from the user 106 who placed the call.

Network control processor 304 then sends switch control data 322 to matrix switch 306. Switch control data 322 include data that control call routing in matrix switch 306. For calls requiring operator assistance, network control processor 304 sends operator control data 324 to operator console 308. Operator control data 324 includes information on how to handle the operator-assisted call.

Figure 4:
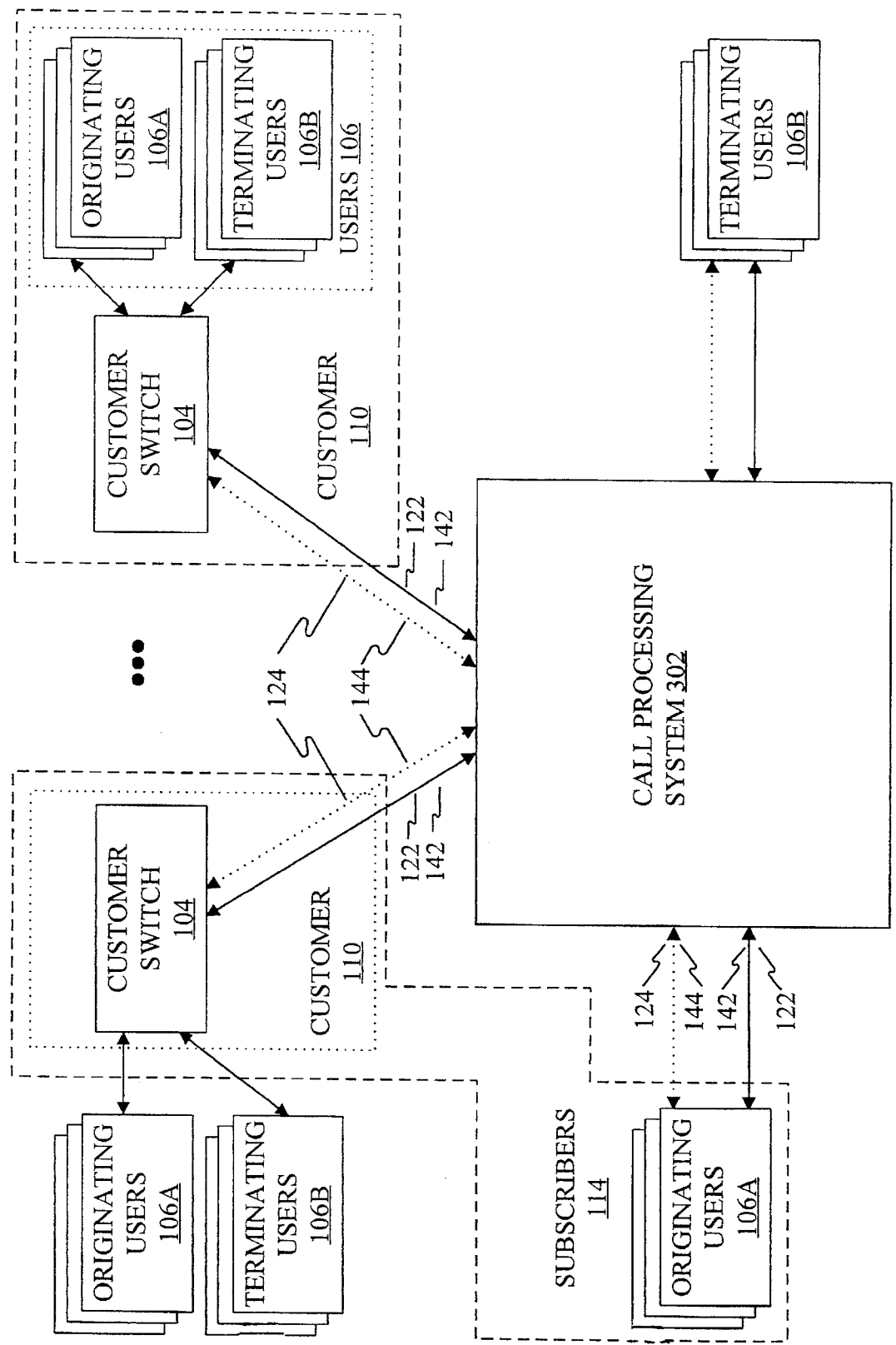
FIG. 4 is a high-level block diagram illustrating the interface of customers and users to the call processing system according to one embodiment of the present invention.

Note that originating user 106A can be a client of a customer 110 of call processing system 302, or a direct subscriber 114 of call processing system 302. Customer 110 can be a business or a carrier procuring enhanced services from call processing system 302. Originating user 106A may place a call directly to call processing system 302 or through customer switch 104. This is more clearly illustrated in FIG. 4. The detail of customer 110 and users 106 is illustrated separately in FIG. 4 for clarity. The term subscribers 114 is used to generally refer to users 106 who are direct clients of call processing system 302 and/or to customers 110. Calls are placed to terminating users 106B. Terminating users 106B may be subscribers 114, clients of customers 110, or any other destination to which a call is placed.

Figure 5:
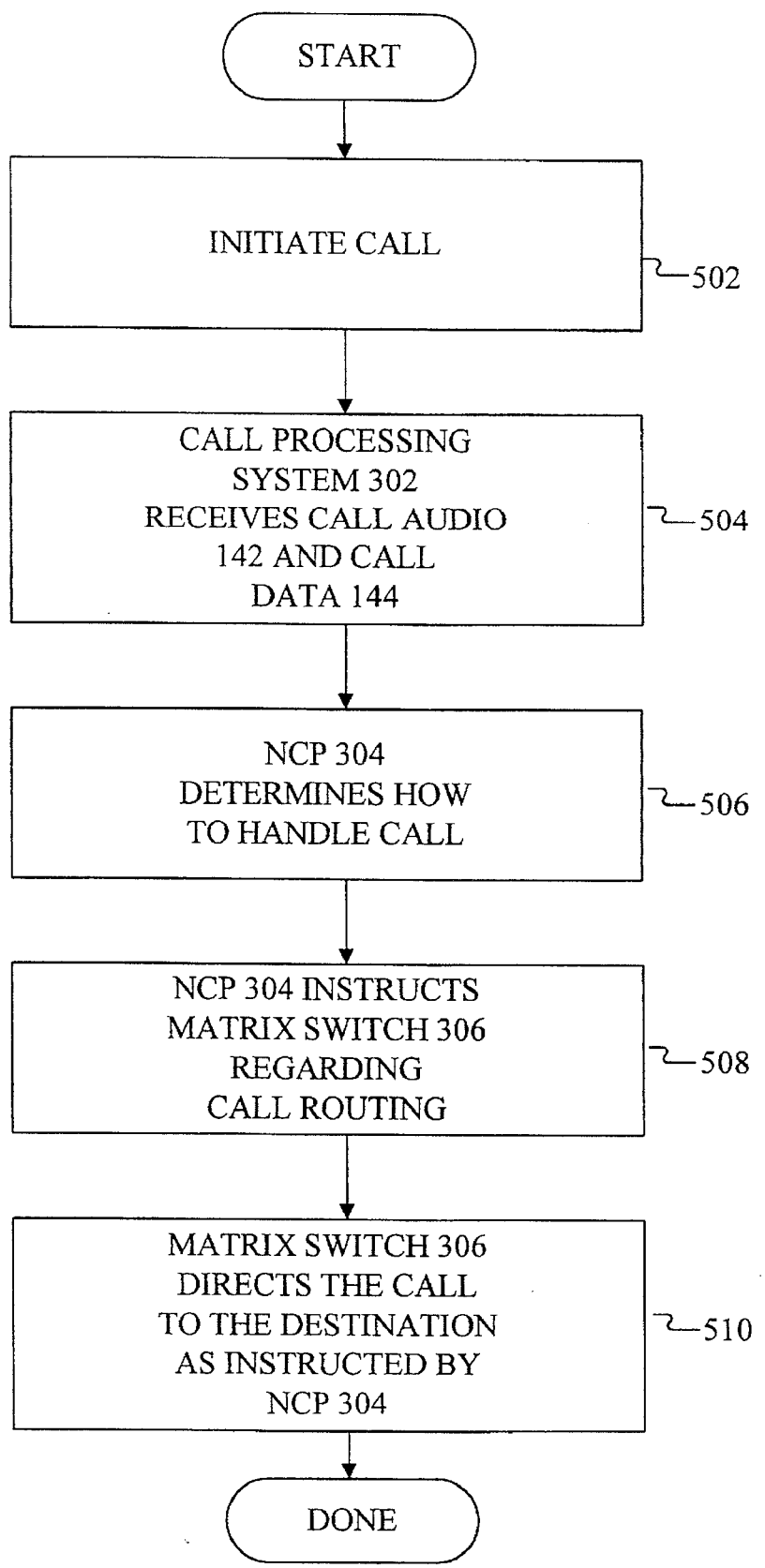
FIG. 5 is a high-level operational flow diagram illustrating the steps involved in placing and completing a call using the call processing system.

Call processing system 302 is best described in conjunction with an example illustrating how calls are handled. FIG. 5 is an operational flow diagram illustrating the steps involved in placing and completing a call using call processing system 302. Referring to FIGS. 3 and 5, these steps are now described.

In a step 502, an originating user 106A initiates a call. In other words, a caller picks up the telephone and dials a telephone number of a called party (terminating user 106B). Examples of user 106 can include a human communicating via a telephone instrument, a fax machine, or a modem. The only difference is that originating user 106A originates the telephone call, while terminating user 106B is the user to whom the call is placed.

The call can be routed directly to network control processor 304, or it could be routed to network control processor 304 via customer switch 104. In the latter case, customer switch 104 forwards call audio 142 and call data 144 associated with this call to call processing system 302. If a customer switch 104 is not in place, call audio 142 goes directly to matrix switch 306 at call processing system 302 and call data 144 to network control processor 304.

In a step 504, call processing system 302 receives call audio 142 and call data 144 for the call initiated in step 502. More specifically, matrix switch 306 receives call audio 142, and network control processor 304 receives call data 144.

In a step 506, network control processor 304 uses call data 144 to determine how to handle the call. Specific details regarding the manner in which network control processor 304 makes this determination are fully described in detail in the Network Control Processor Section of the "Call Processing System and Method" patent document referenced above.

In a step 508, network control processor 304 sends switch control data 322 to matrix switch 306. Switch control data 322 commands matrix switch 306 to route the call to the correct destination. For example, switch control signal 322 may command matrix switch 306 to route the call audio 142 to destination switch 104 at the terminating end and ultimately to terminating user 106B.

The manner in which network control processor 304 commands matrix switch 306 is through sending switch control data 322 to matrix switch 306. The format and content of switch control data 322 depends on the type of matrix switch 306 utilized. Note that in some cases, depending on the customer, a customer switch 104 at the terminating end may not be used. In these cases, the call is routed directly to terminating user 106B.

In a step 510, matrix switch 306 routes the call to terminating user 106B as instructed by network control processor 304 in step 508.

As a result of the functionality provided by network control processor 304, matrix switch 306 no longer controls the call as was the case with matrix switch 102 in the conventional system. Matrix switch 306 now simply functions as a passive switch that is reconfigured based on switch control information 322 sent by network control processor 304.

Network control processor 304 receives all the call data 144 associated with the telephone call. There is no filtering or screening performed before call data 144 is received by network control processor 304. Call data 144 can include, among other call attributes, the originating number, the called number, and the route or circuits activated in customer switch 104. Thus, full control of the call and all its call audio 142 and call data 144 can be provided by call processing system 302.

Figures 6, 7, 8:
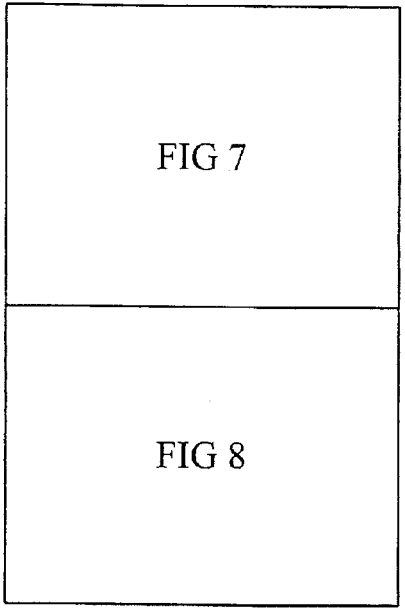
FIG. 6, which comprises
FIGS. 7 and 8, is a high-level operational flow diagram illustrating the process that the call processing system uses to process operator-assisted calls.
Figure 7:
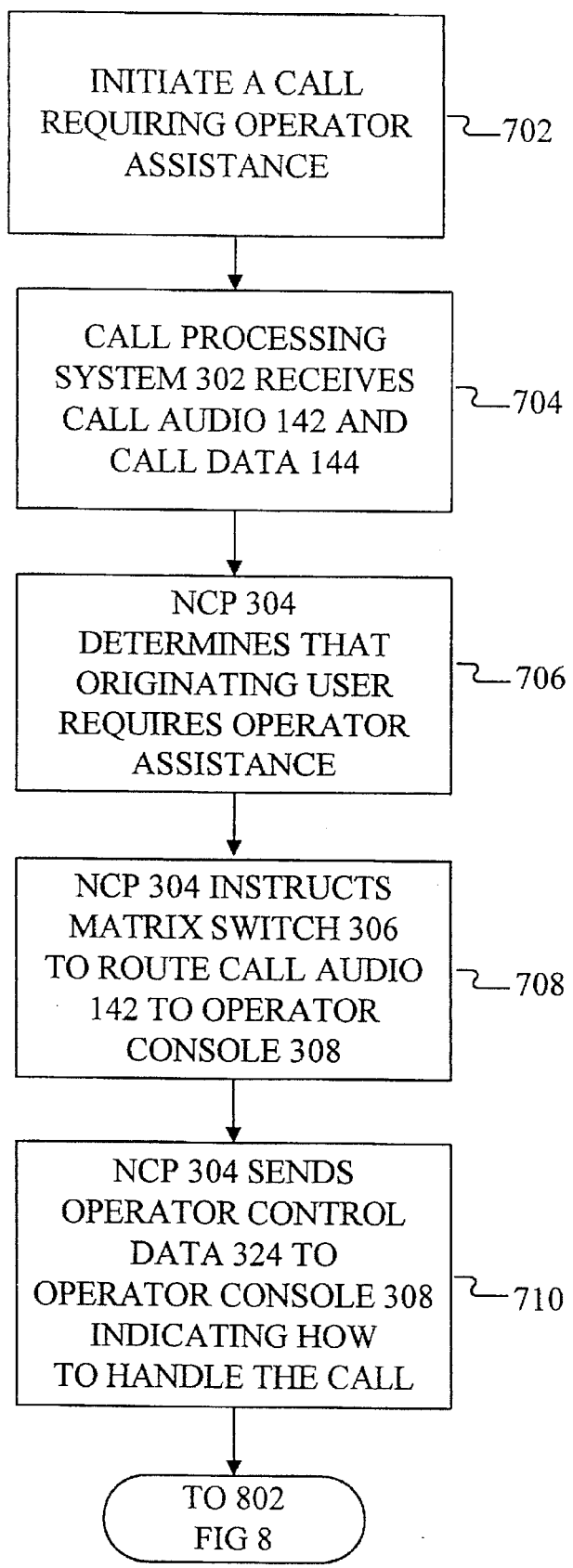
Figure 8:
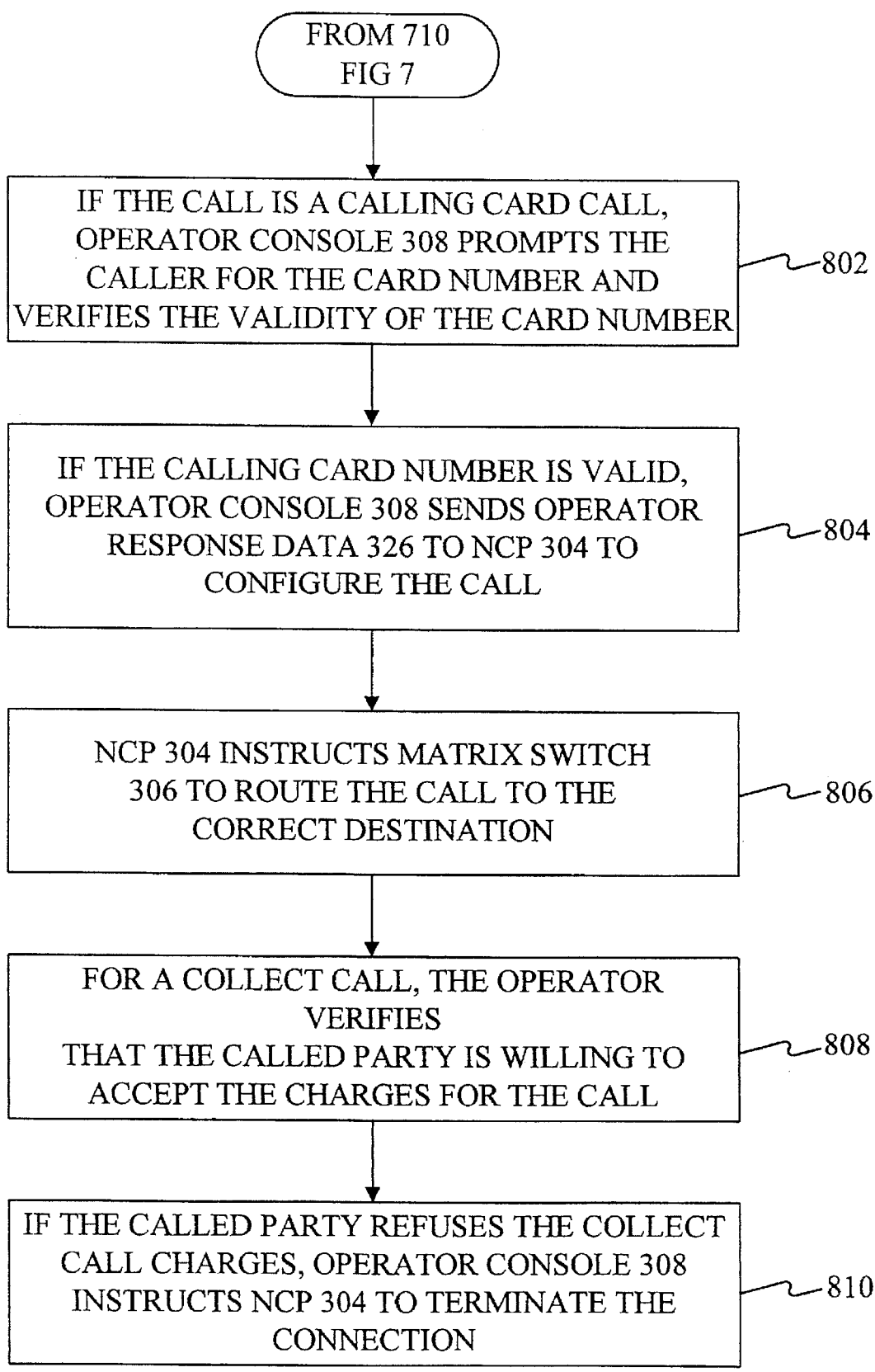

A further high-level illustration of the functionality of call processing system 302 is now described with reference to the following example. In this example, an originating user 106A initiates a call requiring operator assistance. FIG. 6, which comprises FIGS. 7 and 8, is a high-level operational flow diagram illustrating the process that call processing system 302 uses to process operator-assisted calls. Referring now to FIGS. 3, 7, and 8, originating user 106A initiates an operator-assisted call as shown in a step 702.

In a step 704, call processing system 302 receives call audio 142 and call data 144. More specifically, matrix switch 306 receives call audio 142 and network control processor 304 receives call data 144.

In a step 706, network control processor 304 interprets call data 144 and determines that originating user 106 originated a call requiring operator assistance. For example, in one embodiment network control processor 304 could examine the called number and determine that because the first number dialed is zero, the caller is requesting operator assistance.

In a step 708, network control processor 304 instructs matrix switch 306 to route call audio 142 to an operator console 308. If a human operator is not required, call audio 142 can be routed to an automated operator console (for example, an automated voice response unit 334). In this case, the voice response unit 334 instructs the caller on how to proceed. These instructions are typically telephone keypad button sequences to be pressed by the caller to complete the call. An example of this is where voice response unit 334 instructs the caller to enter a calling card number.

If a human operator is required to handle the call, the call audio 142 is routed to a manual operator console 332. In this case, the caller can converse with the operator. An example of this case is where the caller is placing a collect call.

Where matrix switch 306 is a DMS 250, network control processor 304 simply instructs the DMS 250 to route the call to the console position assigned to operator console 308. Because operator console 308 only gets call audio 142, operator console 308 is treated as any other destination and can be identified by a terminating number.

In a step 710, network control processor 304 routes operator control data 324 to operator console 308 via a LAN 328. Operator control data 324 instructs operator console 308 regarding the handling of the call. Operator control data 324 is determined by network control processor 304 when network control processor 304 receives call data 144.

There is a key distinction between call-processing system 302 and the conventional system illustrated in FIG. 1. With the conventional system, special operator console ports are required to allow an operator console 108 to be interfaced to matrix switch 102. This is because control information had to be provided by matrix switch 102 to operator console 108.

However, according to call processing system 302, matrix switch 306 only has to transfer call audio 142 to operator console 308. The control information is provided by network control processor 304 in the form of operator control data 324. Operator console 308 only gets call audio 142 from matrix switch 306. Therefore, operator console 308 can be treated as if it is any other terminating user 106B or customer switch 104. Thus operator console 308 does not have to interface to matrix switch 306 via a special operator console port. Therefore, the number of operator consoles 308 that can interface to matrix switch 306 is not limited to the number of operator console ports available on matrix switch 306.

Operator console 308 now has a connection with audio channel 122. As noted above, operator console 308 can be either a manual operator console 332 for a human operator, or an automated voice response unit 334.

If originating user 106A is placing a calling card call, originating user 106A is prompted by operator console 308 to enter the calling card number. The number is received and verified to ensure that it is a valid number. If the number is invalid, the user is informed that the call cannot be completed. This occurs in a step 802 (FIG. 8).

For valid calling card numbers and for collect calls, operator console 308 initiates the connection to the terminating user 106. This occurs as described in steps 804–808 as follows.

In a step 804, operator console 308 sends operator response data 326 to network control processor 304 via LAN 328 indicating that the call can be placed as requested. In response, network control processor 304 sends switch control data 322 to configure matrix switch 306. This tells matrix switch 306 how to route the call. As a result, matrix switch 306 is reconfigured to direct the call to the destination as instructed by network control processor 304. This occurs in a step 806.

For a collect call, the operator asks whether the called party is willing to accept the charges. This occurs in a step 808.

If the called party is not willing to accept the charges, operator console 308 sends operator response data 326 to network control processor 304 indicating that the call should be terminated. This occurs in a step 810.

It should be understood that the two examples of placing a collect call and a calling card call are offered as examples only. These examples should not be interpreted to imply that the call processing system 302 is limited to only these types of capabilities.

Call processing system 302 provides additional value-added features to telephone services. Call processing system 302 can be configured to provide the capability for, among other things, operator-assisted calling, calling card and credit card calling, number translation and forwarding, real-time call billing, and real-time call rating.

2.0 Message Delivery Service

The message delivery system according to the invention is now described in the environment of an enhanced call processing system such as the one described above in Section 1.2 of this document. After reading this description, it will become apparent to a person skilled in the art how to implement the message delivery system in the environment of a standard call processing system such as that described in Section 1.1 of this document, and also in the environment of alternative call processing systems.

Figure 9:
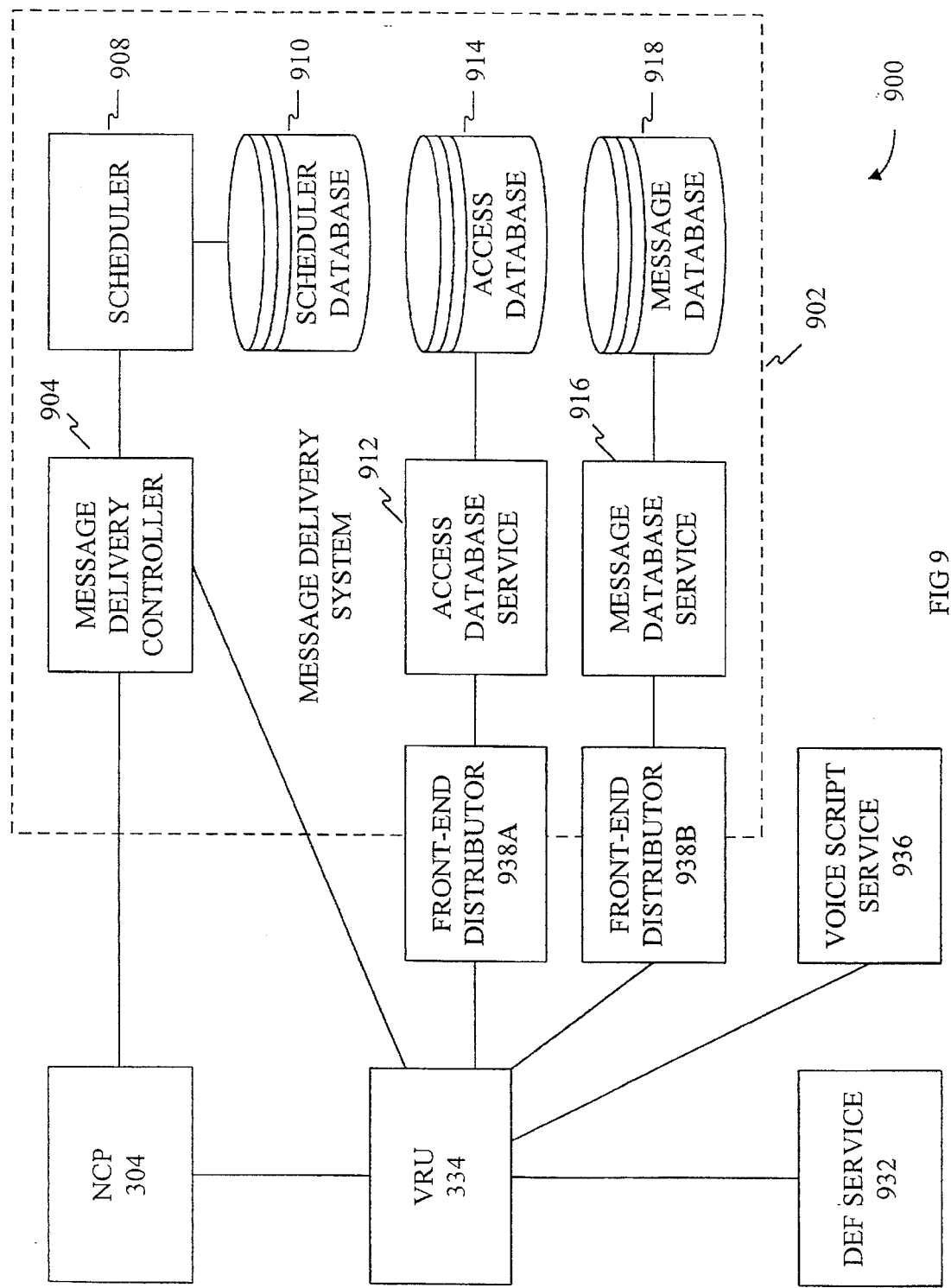
FIG. 9 is a block diagram illustrating a message delivery service according to one embodiment of the invention.

FIG. 9 is a block diagram illustrating a message delivery service 900 according to one embodiment of the invention. In this embodiment, message delivery service 900 is implemented within a call processing system 302 including a network control processor 304, an automated voice response unit 334, and a message delivery system 902.

In this embodiment, message delivery system 902 includes a message delivery controller 904, a scheduler 908, an access database service 912 and a message database service 916. Associated with scheduler 908 is a scheduler database 910. Also included in this embodiment are access database 914 and message database 918.

As stated above, message delivery system 902 is described in terms of the environment of an enhanced call processing system 302. As such, FIG. 9 illustrates message delivery system 902 as interfacing to a network control processor 304, an automated voice response unit 334, a DEF service 932, and a voice script service 936. Voice script service 936 is fully described in co-pending patent application of common assignee titled "Distributed Voice System and Method," as referenced above.

In one embodiment, message delivery controller 904 is a UNIX application running on a UNIX-based processor system having a central processing unit, random access memory, and disk data storage. In an alternative embodiment, message delivery controller 904 can be configured using any platform, but preferably with a multitasking platform. At a high level, message delivery controller 904 coordinates the timing of a message delivery between scheduler 908, network control processor 304 and automated voice response unit 334.

In a preferred embodiment, message delivery controller 904 has the capability of processing multiple requests simultaneously. Message delivery controller accepts requests to schedule an event and can modify scheduling data. For example, message delivery controller 904 can increase or decrease the number of retry delivery attempts for a given message. Message delivery controller 904 also checks to see whether automated voice response unit 334 is operational and processing an event.

In one embodiment, scheduler database 910 is a C-tree database that stores information in tables and tracks the time for an event to occur. When such a time arrives, scheduler 908 informs message delivery controller 904.

Also illustrated on FIG. 9 are front-end distributors 938. According to the illustrated embodiment, one front-end distributor 938A is provided for access database service 912 and another front-end distributor 938B is provided for message database service 916.

Message delivery service 900 is used to control message scheduling and delivery for the call processing system (e.g., enhanced call processing system 302). Specifically, message delivery service 900 controls the recording, storage, and delivery of messages. Messages are recorded at the request of a user 106 (e.g., subscriber or other user) for delivery to another user 106. At the user's request, the recorded message can be stored for delivery at a later date and time.

Message delivery controller 904 controls the message scheduling and delivery within the message delivery system 902. In one embodiment, automated voice response unit 334 records messages from users 106 and delivers messages to recipient users 106 and indicates the outcome of each delivery attempt: delivered or not delivered.

In alternative embodiments, the automated voice response unit can be replaced with an application that delivers 'time and charges' information for timing long distance calls, such as those used to time calls placed from a hotel. Time and charges is the method used to bill the originating user 106. The time and charges application times and rates the call, derives a cost and initiates a message delivery without human intervention by sending a SCHEDULE EVENT REQUEST to the message delivery controller 904. The method of delivery can be voice script sent through an automated voice response unit, a facsimile sent through a facsimile device, electronic data sent through a modem, or other like delivery schemes. The automated voice response unit 334 also can be replaced with an application for sending billing information to a carrier. Rather than sending a paper copy of billing information, the information can be sent via modem without human intervention.

One benefit of scheduling the delivery is that the process can be set to deliver information at a predetermined time. This allows a client to take advantage of lower long distance rates when information is sent during discounted periods, such as at night. If the information is time-sensitive, such as time and charges, the message delivery can be initiated immediately. The originating user's telephone charges can be added to his or her hotel bill to be collected on check-out.

The message delivery controller 904 can be replaced with other applications of call processing system 302 such as a conference calling controller (fully described in co-pending patent application "System and Method for Call Conferencing" referenced above). Instead of scheduling a message delivery, the conference calling controller can schedule the time to set up an automated conference call.

It should be understood that the architecture of call processing system 302 with message delivery system 902 as described above and as illustrated in FIG. 9 is a representative architecture of one embodiment of the invention. It will be apparent to a person skilled in the relevant art how the invention can be implemented using alternative functional and/or physical architectures.

The operation of call processing system 302 with message delivery system 902 is now described.

Figure 10:
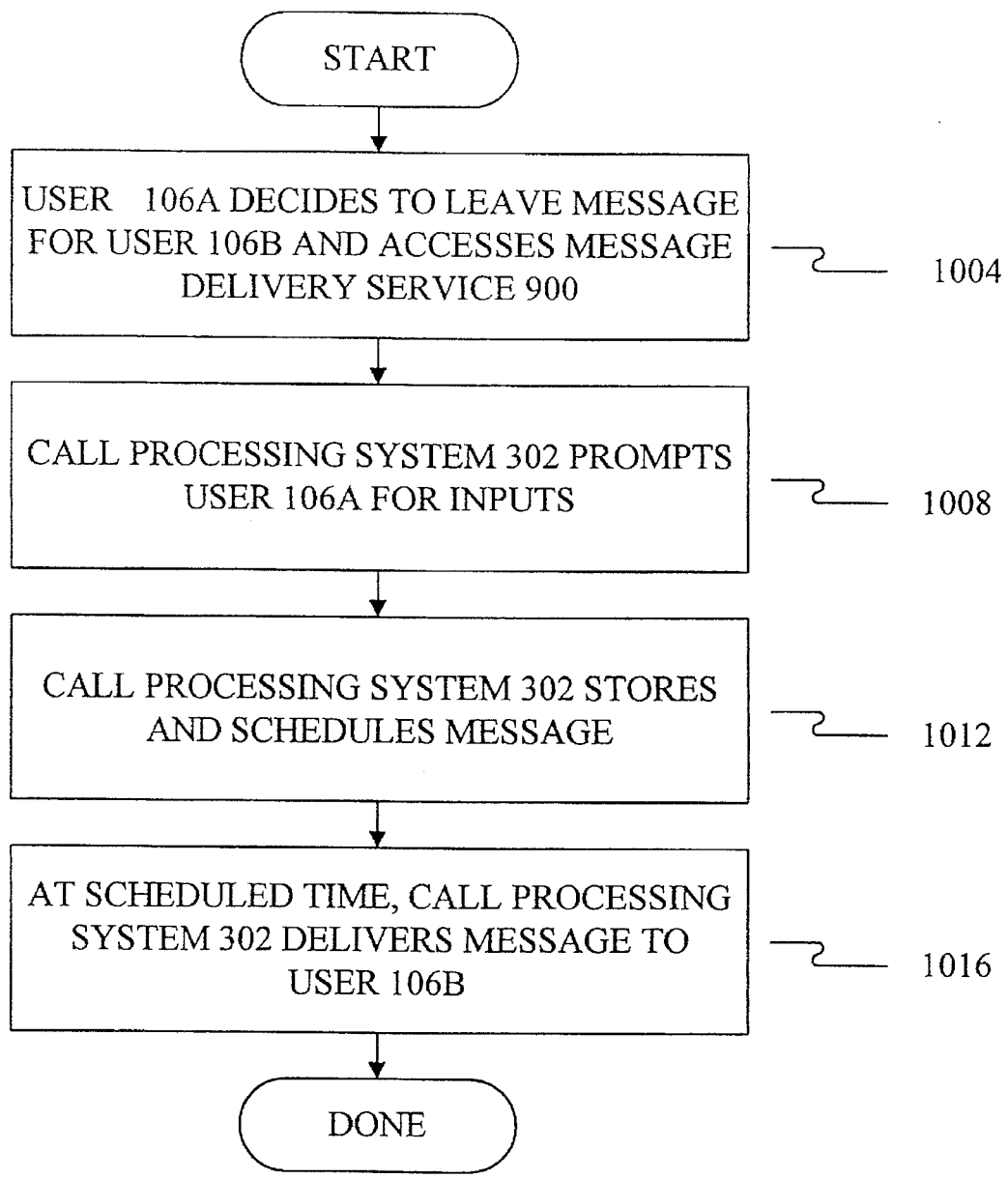
FIG. 10 is a high-level operational flow diagram illustrating the operation of the message delivery service according to one embodiment of the invention.

FIG. 10 is a high-level operational flow diagram illustrating the operation of message delivery service 900. In a step 1004, a user 106 (e.g., user 106A) decides to leave a message for a second user 106 (e.g., user 106B) and accesses message delivery service 900. This situation may arise where, for example, user 106A knows that user 106B is unavailable but wants to get a message to user 106B, where user 106A wishes to send data at a later time or where user 106A attempts to call user 106B and user 106B is unavailable. Preferably, one or both users 106 are subscribers to call processing system 302.

In a step 1008, call processing system 302 prompts user 106A for input regarding the message. The input for which user 106A is prompted includes message delivery and schedule information and other message options, as well as the actual message itself. It should be noted that the message type can include, but is not limited to, voice messages, facsimile messages, and data messages (e.g., modem or other data).

The message can be delivered to user 106B immediately. Alternatively, in a step 1012, call processing system 302 stores the message and schedules it for delivery to user 106B. At the scheduled time, in a step 1016, call processing system 302 delivers the message to user 106B.

2.1 Message Recording and Scheduling

Figure 11:
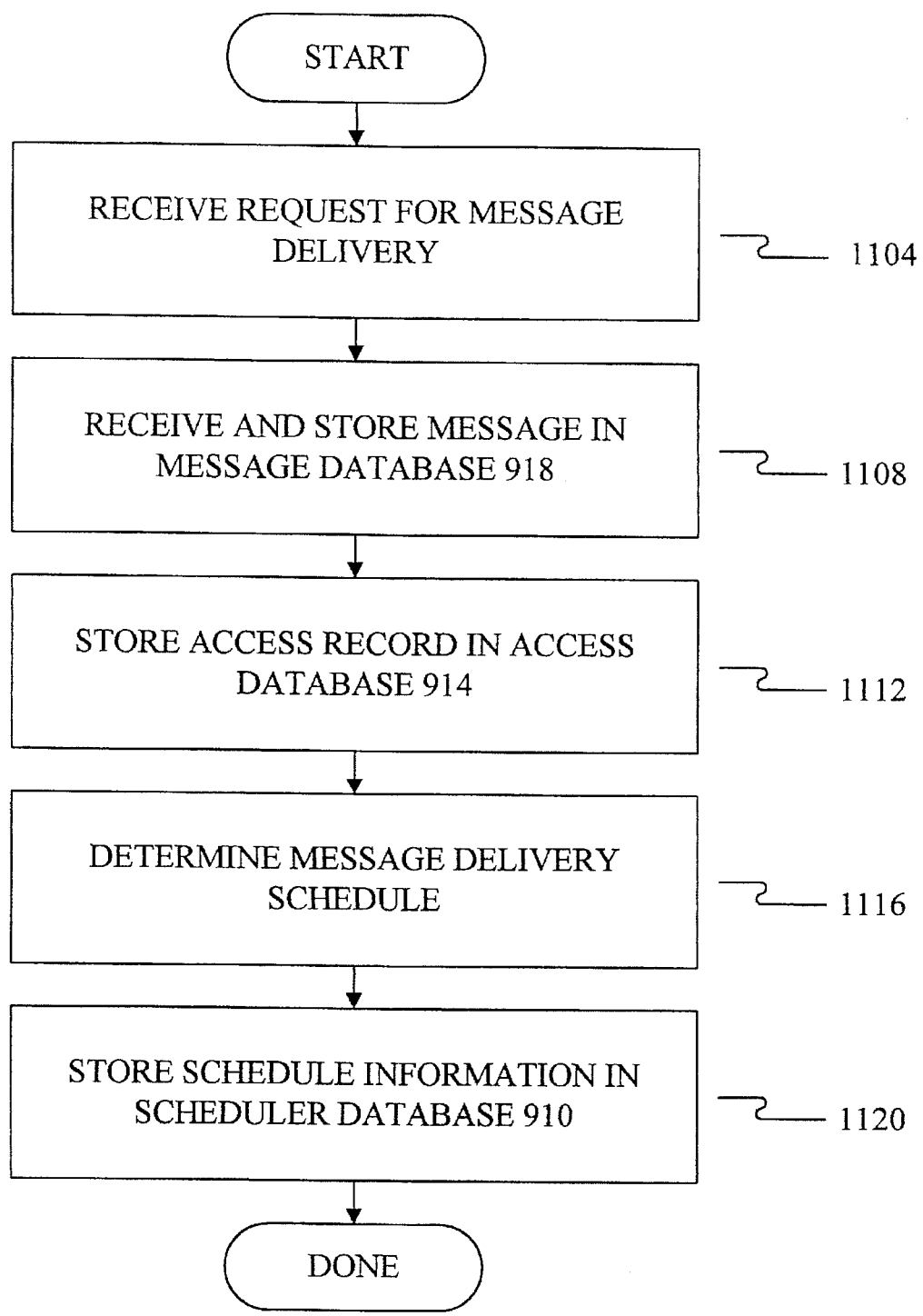
FIG. 11 is an operational flow diagram illustrating the manner in which the message delivery service stores and schedules messages (i.e. step 1012, FIG. 10).

Having thus described a high-level operational overview for message delivery service 900, the storing and scheduling of messages is now described in more detail. FIG. 11 is an operational flow diagram illustrating the manner in which message delivery service 900 stores and schedules messages (i.e. step 1012, FIG. 10) according to one embodiment of the invention. In a step 1104, message delivery service 900 receives a request for message delivery from user 106A. In a step 1108, message delivery service 900 receives and stores the message in message database 918. An access record corresponding to the stored message is stored in access database 914. This occurs in a step 1112.

Because message delivery service 900 offers the feature of scheduling delivery of a message at a specific date and time, message delivery system 902 determines the message delivery schedule and stores a SCHEDULE EVENT in scheduler database 910. This occurs in steps 1116 and 1120. The SCHEDULE EVENT indicates the date and time at which a message delivery attempt is to be initiated.

As illustrated in FIG. 9, storage and retrieval of records in access database 914 and message database 918 are accomplished using access database service 912, message database service 916 and the appropriate front-end distributor 938. Front-end distributors 938 according to one embodiment are fully described in the co-pending patent application entitled "Distributed Voice System and Method" as referenced above. Although the invention is illustrated and described in terms of this preferred embodiment, it will be apparent to a person skilled in relevant art that alternative systems and methods used for storing and retrieving records in databases (such as access database 914 and message database 918) can be used.

Figure 13:
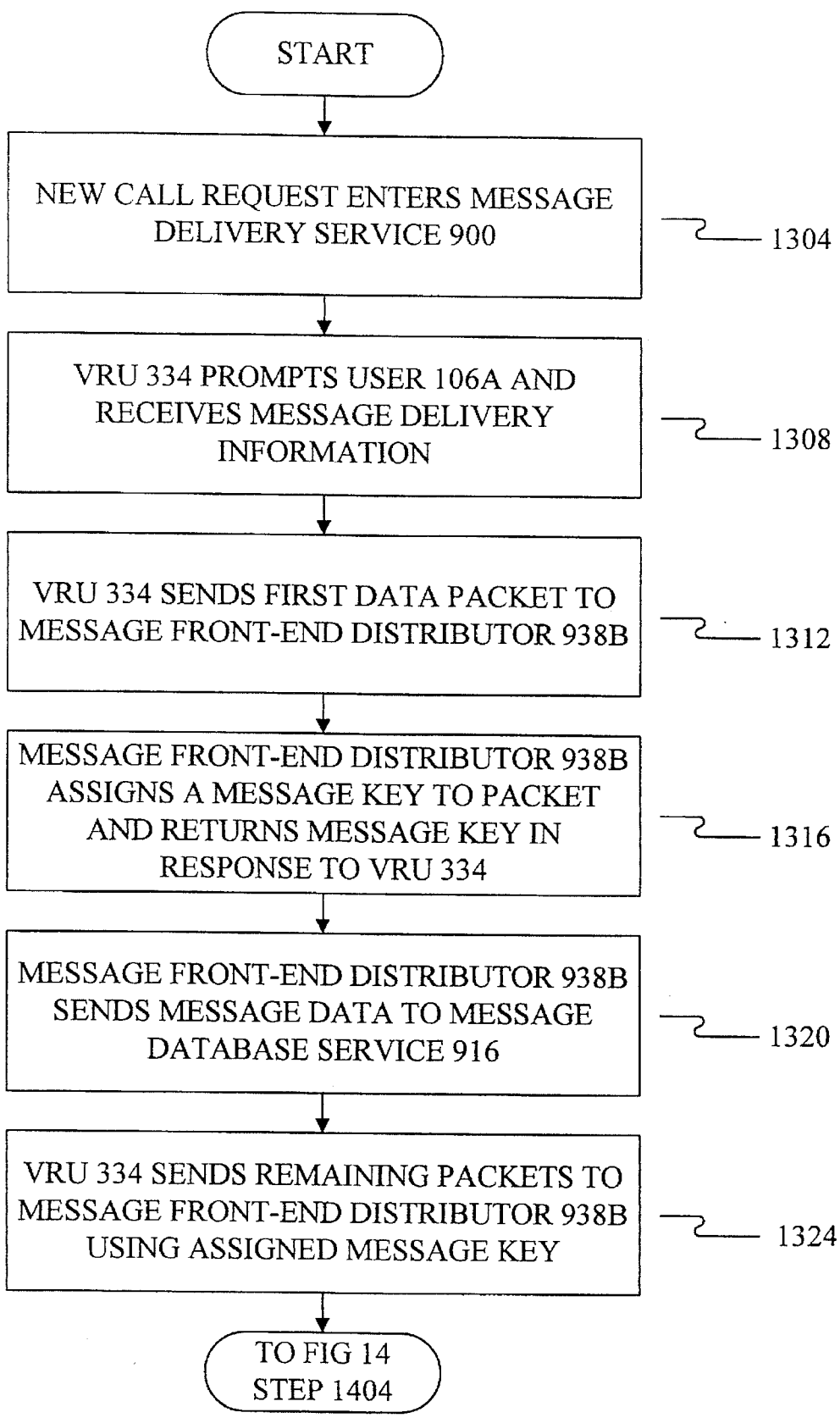
FIGS. 13, 14 and 15 is an operational flow diagram that details a process for storing and recording messages according to one embodiment of the invention.
Figure 14:
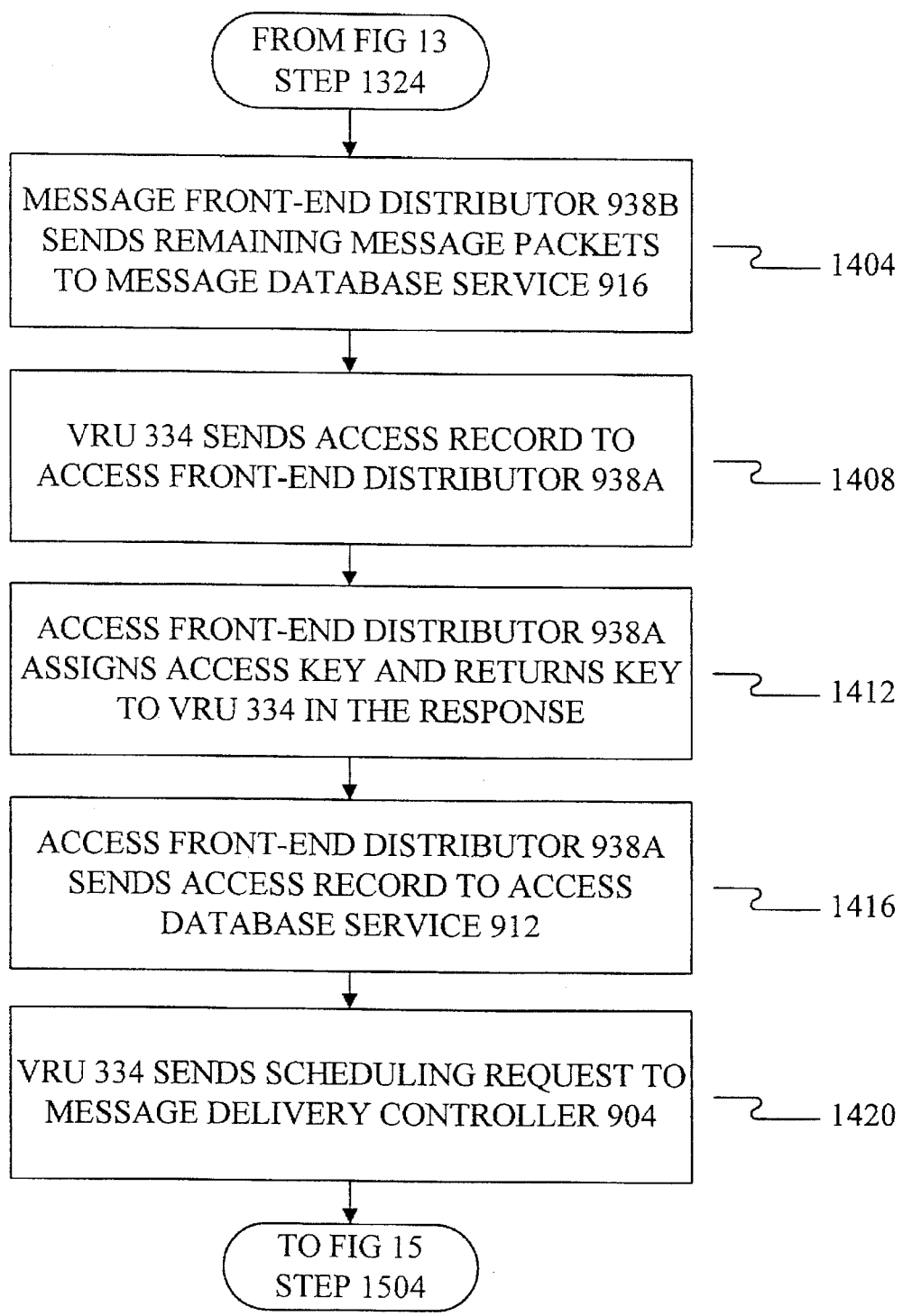
Figure 15:
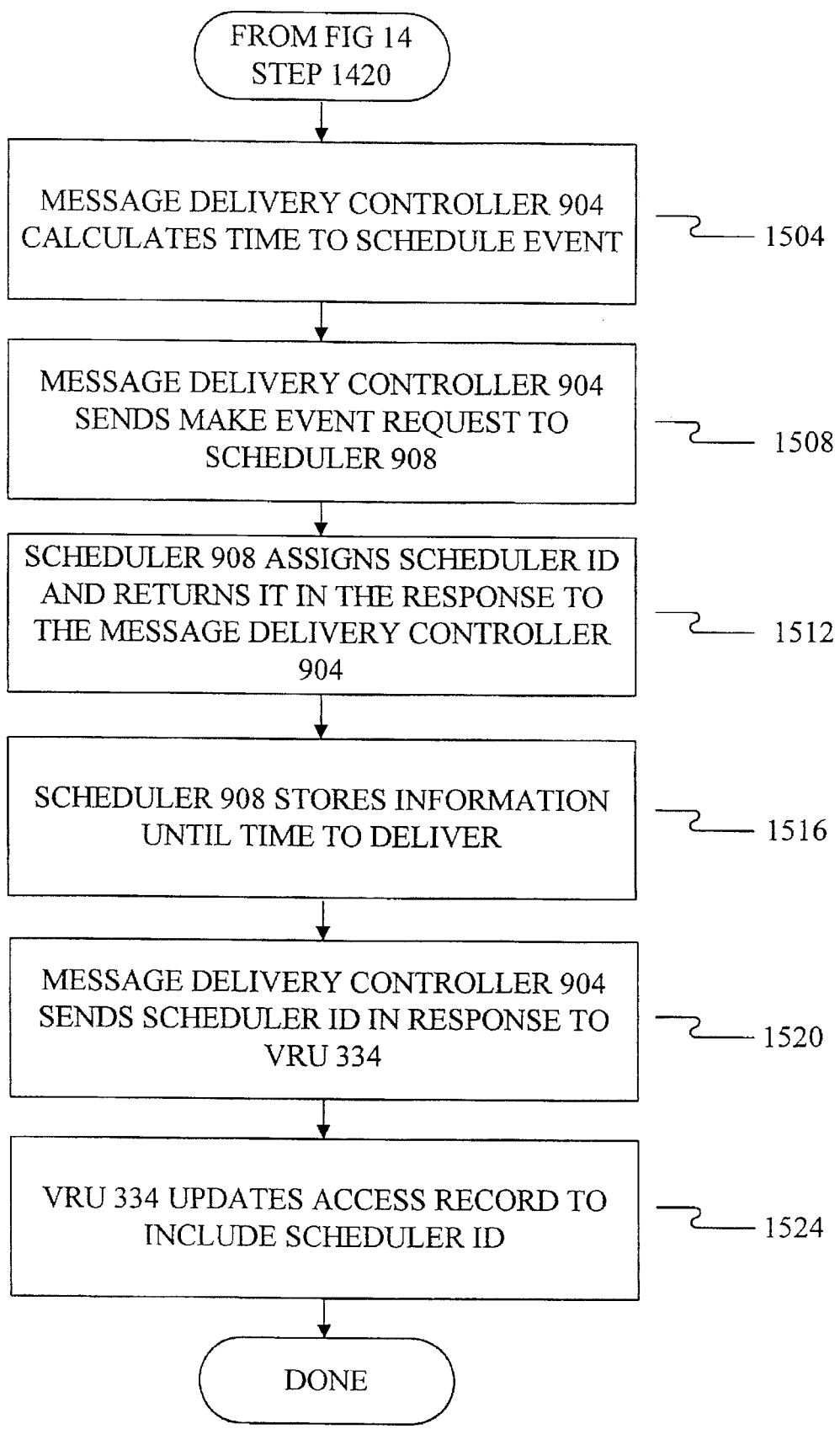

FIG. 12, which comprises FIGS. 13, 14 and 15 is an operational flow diagram that details a process for storing and recording messages according to one embodiment of the invention. FIG. 12 (i.e., FIGS. 13, 14 and 15) illustrates in greater detail the operational flow illustrated in FIG. 11. In a step 1304, a NEW CALL REQUEST enters message delivery service 900. In the environment of enhanced call processing system 302, as described above, when user 106A places a call, call data 144 is routed to network control processor 304 and call audio 142 is routed to matrix switch 306.

Based on call data 144, network control processor 304 determines whether operator assistance is required. Preferably, calls requiring operator assistance are routed to an automated voice response unit 334 to provide such assistance. In the case where user 106A desires to have a message delivered to user 106B, automated voice response unit 334 coordinates message delivery service 900 in this embodiment.

In one embodiment, user 106A initiates this message process by dialing into call processing system 302 using an enhanced services card and selecting the message delivery option. This selection can be made, for example, by pressing a key on the telephone key pad.

In a step 1308, automated voice response unit 334 prompts user 106A for message delivery information. Automated voice response unit 334 temporarily stores this information as it is being entered by user 106A. The message delivery information collected can include sender identification (e.g., the name of user 106A), recipient identification (e.g., the name of user 106B), the destination telephone number, and the date and time that delivery attempts are to be initiated (i.e., scheduling information). Table 1 illustrates an example of the data that can be collected and stored according to one embodiment of the invention.

TABLE 1

| COLLECTED DATA |
| --- |
| Sender Name |
| Recipient Name |
| Message |
| Destination Telephone Number |
| Time to Begin Delivery Attempt |

The automated voice response unit 334 also prompts user 106A for the message itself. In one embodiment, the prompting provided by automated voice response unit 334 is accomplished by playing voice scripts to user 106A that request information be entered via the telephone key pad, voice response or electronic data. This embodiment where voice scripts are played to user 106A is ideal for providing instructions to a human sending the message.

In another embodiment, automated voice response unit 334 can play scripts that are machine-readable. For example, where a computer system is using call processing system 302 to send a data message to another computer system, the scripts played can be data scripts that play tones or other machine-readable signals to the sending computer system.

The manner in which scripts are stored and played to users 106, such as user 106A according to one embodiment, is described in co-pending patent application titled "Distributed Voice System and Method" as referenced above. Because unique scripts can be stored and played for a particular user 106 and/or a particular customer 110, special accounts can be set up to handle custom data communications as well as to provide custom voice scripting.

Once the caller decides the message is ready to be sent, an action such as a key press is taken to complete the message recording process.

In a step 1312, automated voice response unit 334 sends the first data packet of the message to message database 918.

Specifically, in the embodiment illustrated in FIG. 9, automated voice response unit 334 sends this first packet to front-end distributor 938B for message database service 916.

In a step 1316, message front-end distributor 938B assigns a message key to the data packet and returns this message key to automated voice response unit 334. The message key is a unique identifier assigned to each message by front-end distributor 938B. In the case of a voice message, message keys are returned for three components of the message: the sender's name, the recipient's name, and the message. The manner in which this is accomplished according to one embodiment is fully described in the co-pending patent application titled "Distributed Voice System and Method" as referenced above.

In a step 1320, front-end distributor 938B forwards the message data packet to message database service 916 for storage in message database 918.

In a step 1324, automated voice response unit 334 sends subsequent packets of the message to front-end distributor 938B using the assigned message key. This process continues until all remaining packets are sent. In one embodiment, the packets are identified using the message key assigned to the first data packet and using a sequential packet number. In step 1404, front-end distributor 938B sends these remaining message packets to message database service 916 for storage in message database 918.

In a step 1408, automated voice response unit 334 sends an access record to front-end distributor 938A. This access record includes all relevant message information. This message information can include, but is not limited to, the destination telephone number, the time at which the message was recorded, the length of the message in seconds, the message key, a blank scheduler ID, a blank time delivered field, and a blank message access key.

Table 2 illustrates an example of the information contained in an access record according to one embodiment of the invention. Note that the scheduler ID field, time delivered field, and access field of the access record are blank at this stage of message processing.

TABLE 2

| ACCESS RECORD |
| --- |
| Destination Telephone Number |
| Time Message Recorded |
| Length of Message |
| Message Key |
| Scheduler ID (Blank) |
| Time Delivered Field (Blank) |
| Access Key (Blank) |

In a step 1412, front-end distributor 938A assigns an access key to the message and returns this access key to automated voice response unit 334. This access key is a unique identifier that is used to retrieve the access record pertaining to a specific message delivery. As described below, it is message delivery controller 904 that uses this access key to retrieve the message delivery information. Front-end distributor 938A forwards the access record including the assigned access key to access database service 912 for storage in access database 914. This occurs in a step 1416. Table 3 illustrates the access record entries according to the example illustrated in Table 2. Note that at this stage of processing the access key field is no longer blank, as an access key has been assigned by front-end distributor 938A.

TABLE 3

| ACCESS RECORD |
| --- |
| Destination Telephone Number |
| Time Message Recorded |
| Length of Message |
| Message Key |
| Scheduler ID (Blank) |
| Time Delivered Field (Blank) |
| Access Key |

With the above-described steps accomplished, the message is stored in message database 918, an access record identifying pertinent information is stored in access database 914, and automated voice response unit 334 holds the unique identifier (i.e. the key) to this stored information. In the embodiment described herein, scheduling of the message delivery does not begin until all of these steps are accomplished.

In a step 1420, automated voice response unit 334 sends a SCHEDULE EVENT REQUEST to message delivery controller 904 to schedule the message delivery. The SCHEDULE EVENT REQUEST can be comprised of billing information, the access key, operator console allocation information, scheduling information, and next attempt time information. The operator console allocation information can include a network control processor call type, language information, and the device type array to be used for delivery of the message.

In an embodiment using DEF records, the console allocation information also includes a DEF number. In this embodiment, all information is gathered for a particular account (i.e., at the customer or subscriber level) and stored in a DEF record on account basis. In this manner, efficiencies can be gained by establishing standard information on an account-by-account basis. Table 4 illustrates an example of the information included in SCHEDULE EVENT REQUEST according to one embodiment of the invention.

TABLE 4

| SCHEDULE EVENT REQUEST |
| --- |
| Base Billing Information |
| Access Key |
| Operator Console Allocation Information |
|     DEF Number |
|     NCP Call Type |
|     Language |
|     Device Type |
| Scheduling Information |
|     Maximum Attempts |
|     Default Minutes |
|     Current Attempt (blank) |
|     Array of Attempt Times |
| Next Attempt Time Information |
|     Delivery Status (blank) |
|     Time Type |
|     Time Value |

The network control processor (NCP) call type is a representation (preferably numeric) of the type of call being placed. In the voice message delivery example, the NCP call type could be, for example, record or delivery. Automated voice response unit 334 can be assigned the ability to process message record call types and/or message delivery call types. The language field is a bit mask that is used to identify the language used to interface to user 106A and user 106B. Again, these can be set up on account-by-account basis so that each user 106 has his or her own language preferences specified. These can be identified by the user's account number, phone number, caller's ID, caller's carrier ID, and/or recipient's ID. The device type defines the type of operator console 308 or other device, such as a modem or facsimile device, needed to process the call.

Scheduling information is used to determine the maximum number of delivery attempts and the number of minutes to wait between attempts. User 106A can be prompted to provide scheduling information. Alternatively, the number of delivery attempts and the waiting period between attempts can be configured on an account-by-account basis and stored in a DEF record. When the DEF record is retrieved, automated voice response unit 334 obtains this delivery information for the message. In this alternative, such additional information is not part of the message delivery information retrieved from user 106A based on users prompts. Instead, this additional information is message delivery information that is configurable at the user, subscriber, and/or customer level, and is provided by message delivery service 900.

The next attempt time information contains the time to begin message delivery as provided by user 106A during the collection of initial message delivery information. User 106A can select a specific date and time to begin message delivery attempts, such as Tuesday at 7:15 p.m., or such as Feb. 12, 1995, at 7:15 p.m. eastern standard time. Alternatively, user 106A can indicate a period of time to wait before attempting delivery from the time the message is recorded.

Figure 25:
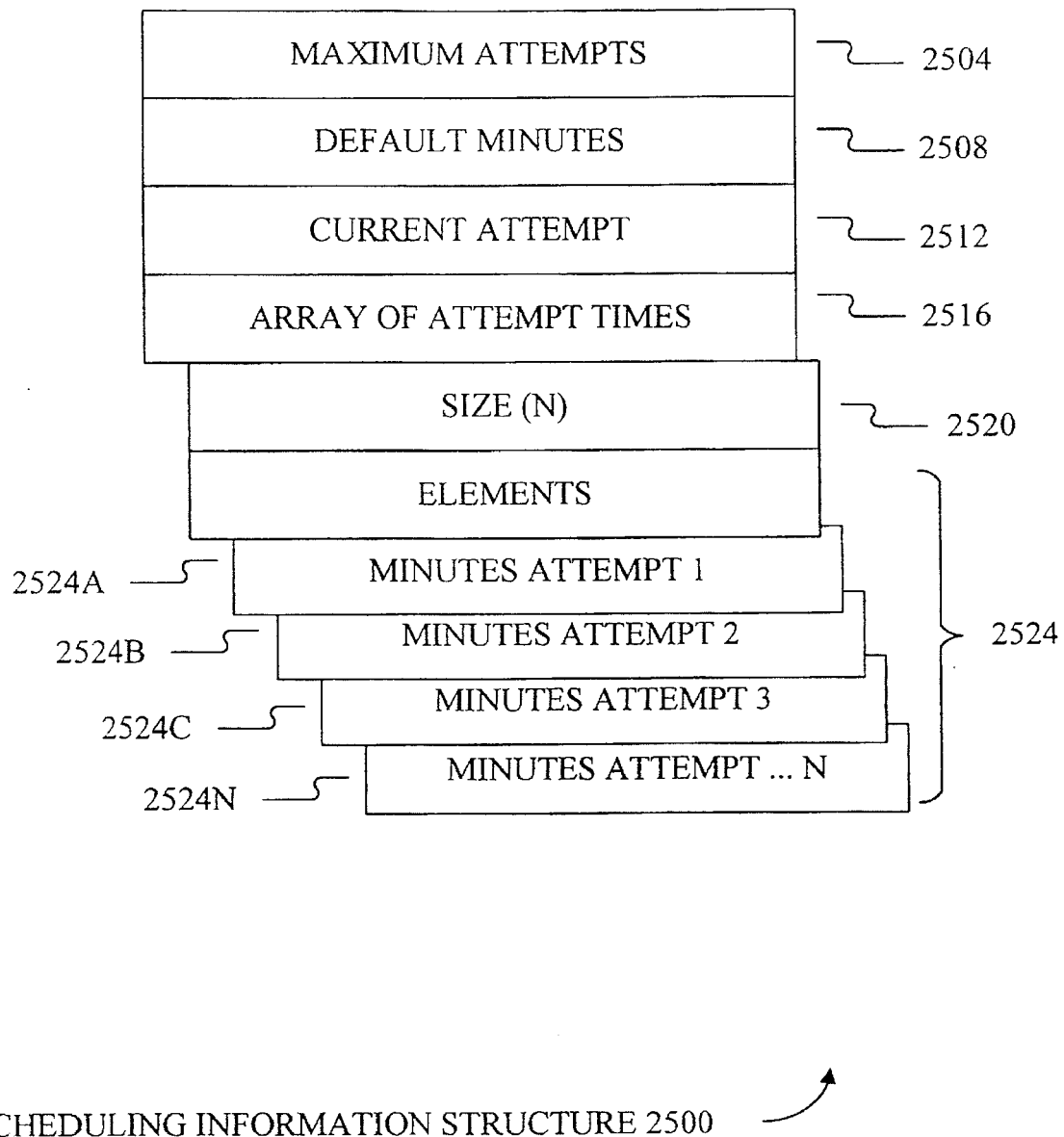
FIG. 25 is a block diagram illustrating a scheduling information structure used to determine the strategy for message delivery.
Figure 26:
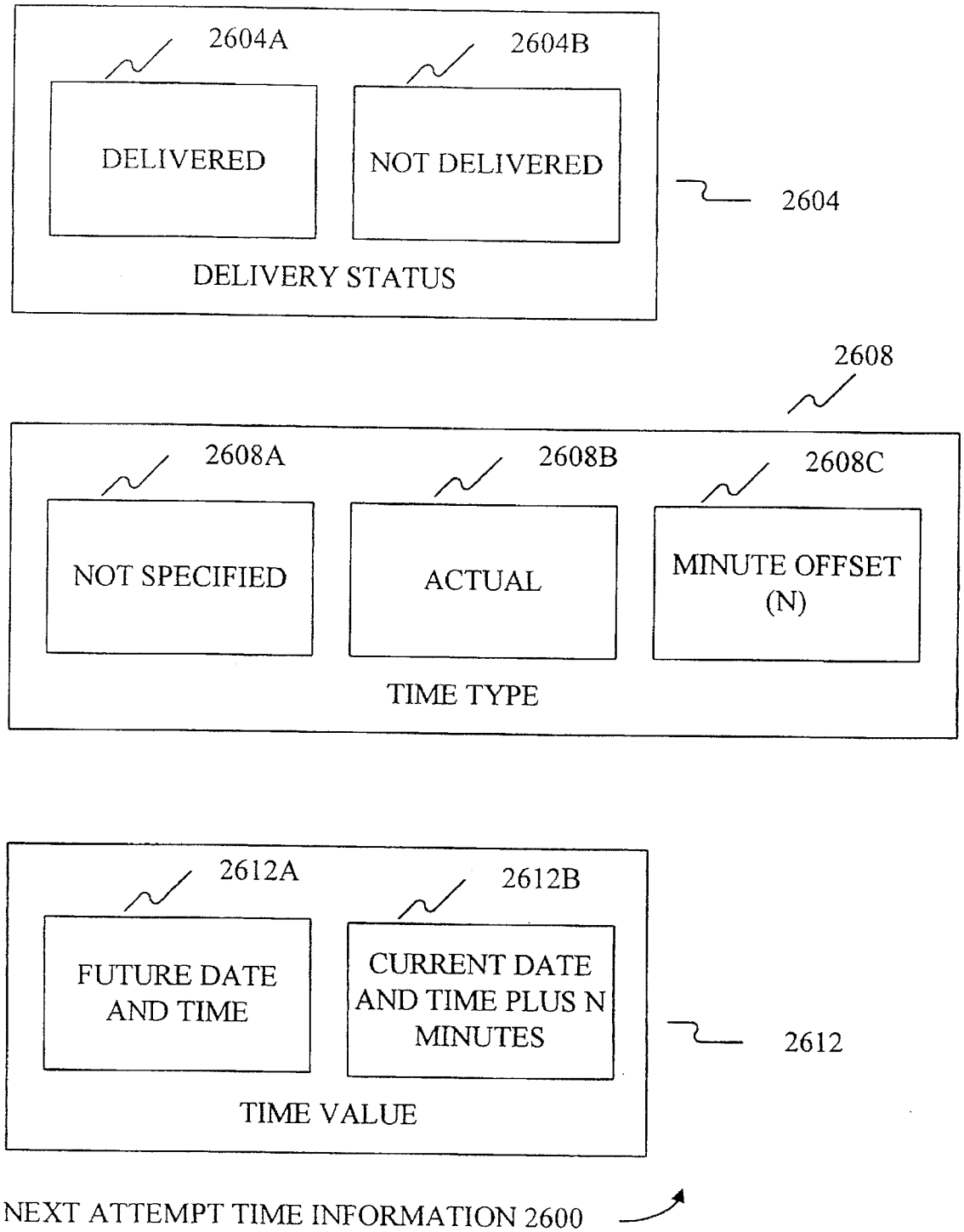
FIG. 26 is a diagram illustrating variables used to calculate message delivery time.

In a step 1504, message delivery controller 904 performs a time calculation to determine when to start the first message delivery attempt. This determination is made based on the scheduling and next attempt time information provided by automated voice response unit 334 in step 1420. The automated voice response unit 334 provides the next attempt time variables to enable message delivery controller 904 to calculate the next attempt time. These variables are delivery status, time type and time value. These fields are represented in FIGS. 25 and 26 and are addressed in more detail below. During initial message delivery setup, message delivery controller 904 ignores the delivery status field because at this stage, this field is always set to "not delivered."

Time type refers to the method used to determine the next retry attempt. Time type can have three values: not specified, actual, and minute offset. The "not specified" time type uses the scheduling information to calculate a delivery time when a time has not been entered by the user. "Actual time" type refers to a future date and time entry specified by user 106A in step 1308. "Minute offset" type is a specific number of minutes (M) from the time at which the message is recorded. Preferably, the time is referenced based on Greenwich Mean Time (GMT). For example, a 15 minute offset means that the message delivery attempt would begin 15 minutes from the time that recording of the message from user 106A was completed.

In a step 1508, message delivery controller 904 uses the information sent in the SCHEDULE EVENT REQUEST (including the delivery time determined in step 1504) to compile a MAKE EVENT REQUEST. Message delivery controller sends the MAKE EVENT REQUEST to scheduler 908 to request that the scheduler 908 schedule the message delivery. Table 5 illustrates an example of the information included in the MAKE EVENT REQUEST according to one embodiment of the invention.

TABLE 5

MAKE EVENT REQUEST

Base Billing Information
Access Key
Operator Console Allocation Information
   DEF Number
   NCP Call Type
   Language
   Device Type
Scheduling Information
   Maximum Attempts
   Default Minutes
   Current Attempt
   Array of Attempt Times
Actual Delivery Time Derived
From Next Attempt Time Calculation
Polling Time
Scheduler ID (Blank)
Service Name Scheduler 908 is a database service that provides in one embodiment a C-tree interface to the call processing platform. It also performs three types of event operations: make, perform and remove. The MAKE EVENT REQUEST is received from message delivery controller 904 and creates a new event or updates an existing event. A PERFORM EVENT is generated by scheduler 908 when the event scheduled by the make event expires. The PERFORM EVENT is sent to a designated service, such as message delivery controller 904. The REMOVE EVENT is sent by a service and removes the event created by the MAKE EVENT REQUEST. The type of process to which scheduler 908 interfaces and the type of auxiliary data stored with the event request do not matter.

In one embodiment, multiple instances of scheduler 908 can be included in message delivery system 902 to provide for redundancy. In this case, message delivery controller 904 includes a blank scheduler ID field in the MAKE EVENT REQUEST.

In a step 1512, scheduler 908 assigns a scheduler ID to the MAKE EVENT REQUEST and returns this scheduler ID to message delivery controller 904 in its response.

The scheduler ID is a unique identifier that facilitates communication between scheduler 908 and its interfaces, such as message delivery controller 904 or a conference calling controller. The scheduler ID links scheduler 908 and its interfaces throughout the message delivery attempts. It is a value assigned to the MAKE EVENT REQUEST when that request is initially received by scheduler 908. Any updates to the MAKE EVENT REQUEST—such as storing a new delivery time when a delivery attempt has been unsuccessful—are identified in scheduler database 910 with the scheduler ID. The scheduler ID is removed only when scheduler 908 receives a REMOVE EVENT REQUEST to delete the data pertaining to a particular event, in this case, a message delivery.

In a step 1516, scheduler 908 stores the MAKE EVENT REQUEST received from message delivery controller 904 in scheduler database 910 as a MAKE EVENT RECORD. The MAKE EVENT RECORD indicates that delivery of a particular message is to be initiated at a specific date and time. The scheduler ID assigned by scheduler 908 is inserted in the scheduler ID field.

In the embodiment using scheduler IDs, message delivery controller 904 forwards the scheduler ID received from scheduler 908 to automated voice response unit 334 in the SCHEDULE EVENT REQUEST response. In step 1524, automated voice response unit 334 updates the access record in Access Database 914 for that message to include the scheduler ID assigned by scheduler 908.

A NEXT EVENT TIMER in scheduler 908 indicates when the next event is to take place. When an event has a time greater than the current time, the scheduler calculates a NEXT EVENT TIME for the event that is to expire next. Message delivery controller 904 informs the scheduler of the time of the event in the MAKE EVENT REQUEST. Scheduler 908 calculates the amount of time (preferably the number of milliseconds) between the current time and the event time—the difference being the time until the event is to occur—and sets a next event timer. Scheduler 908 is indifferent as to the type of scheduled event it is tracking. When the timer expires, scheduler 908 sends the event to the controller (message delivery 904, conference calling, facsimile, etc.) indicated by the service name in the MAKE EVENT REQUEST.

Any time another event is added or updated with a time less than the next scheduled event, the time between the current time and the modified scheduled event is recalculated and the NEXT EVENT TIMER is updated to reflect the new event's time.

When the NEXT EVENT TIMER expires, scheduler 908 retrieves all events that have the same event time from the database. These events relate to the delivery of different messages but are processed simultaneously by the service, in this case the message delivery controller 904.

3. Voice Message Delivery

Figure 16:
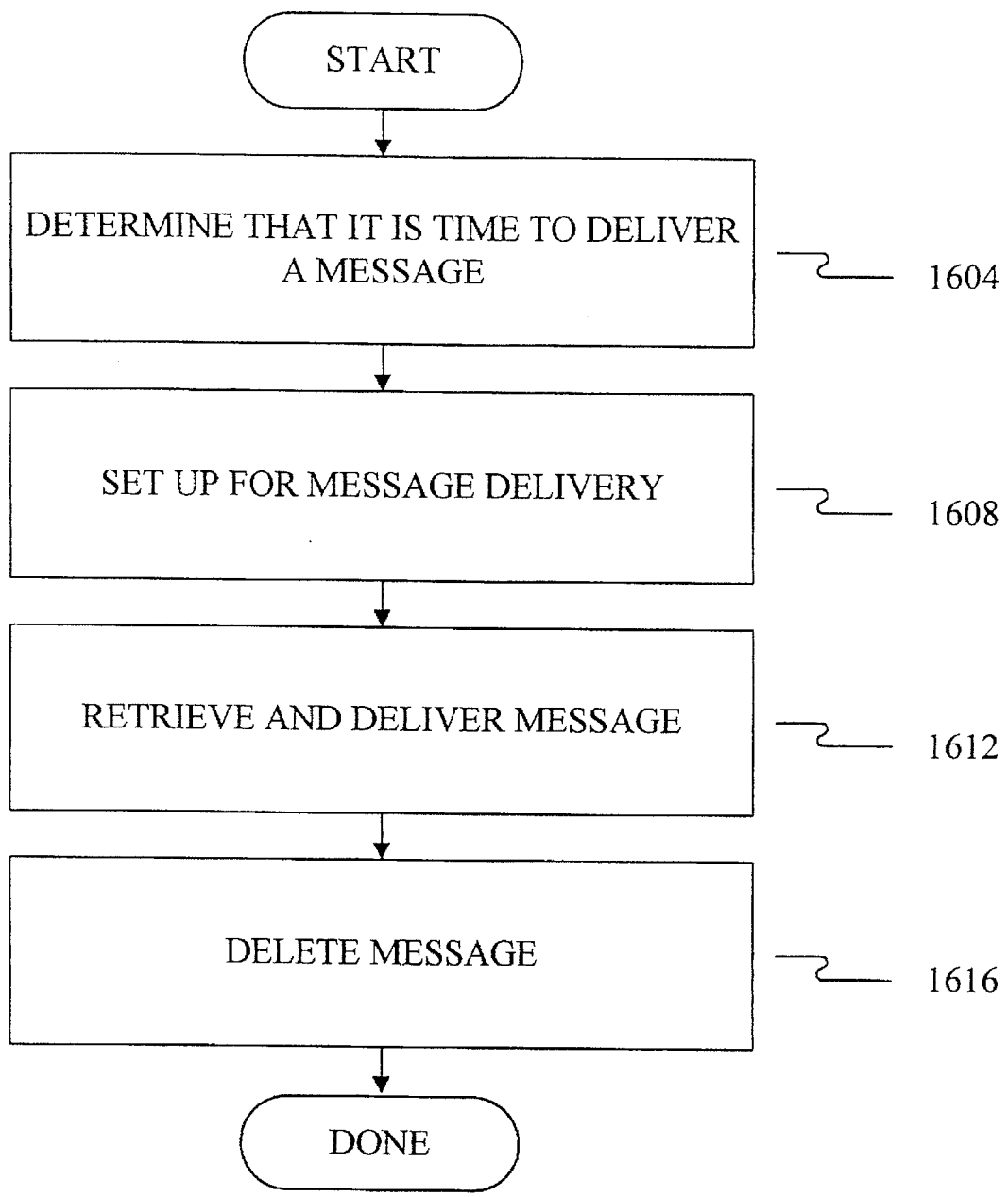
FIG. 16 is a high-level operational flow diagram illustrating a method by which a scheduled message is delivered to a user.

The process of delivering a scheduled message is now described. FIG. 16 is a high-level operational flow diagram illustrating a method by which a scheduled message is delivered to a user 106B. In a step 1604, scheduler 908 determines that it is time to deliver a message left by user 106A for user 106B. Scheduler 908 makes this determination when the NEXT EVENT TIMER expires.

In a step 1608, message delivery service 900 begins the setup procedure for message delivery. In a step 1612, automated voice response unit 334 and network control processor 304 retrieve the message and deliver it to user 106B. After the message has been delivered, in a step 1616, the message is deleted from message database 918.

Figure 17:
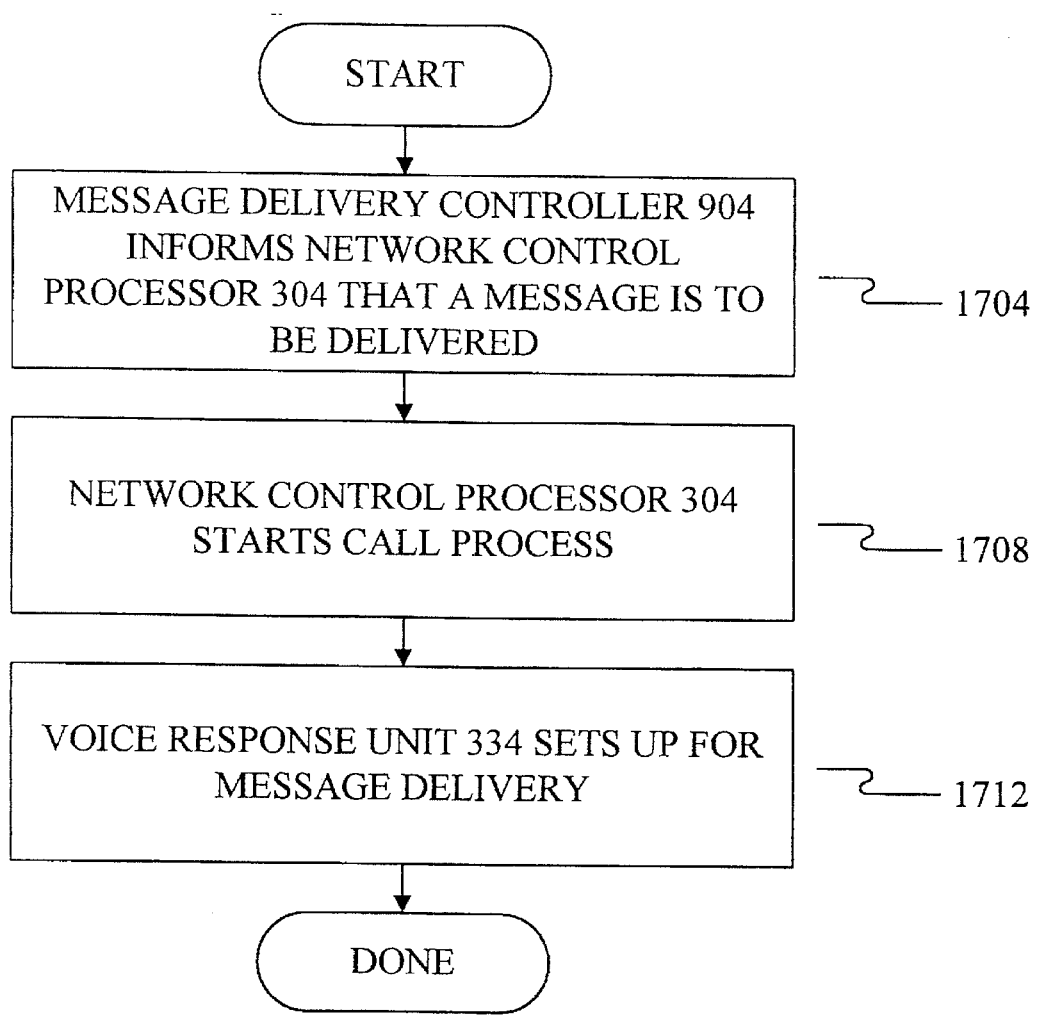
FIG. 17 is an operational flow diagram illustrating the manner in which the message delivery service sets up for message delivery (i.e., step 1608).

Having thus described message delivery at a high level, the steps associated with message delivery are now described in greater detail. FIG. 17 is an operational flow diagram illustrating the manner in which message delivery service 900 is set up for message delivery (i.e., step 1608). In a step 1704, once scheduler 908 determines that it is time to deliver a message, message delivery controller 904 informs network control processor 304 that the message is to be delivered. In response, in a step 1708, network control processor 304 starts a call process and informs automated voice response unit 334 that a message is to be delivered. In a step 1712, automated voice response unit is set up for the message delivery.

Figure 18:
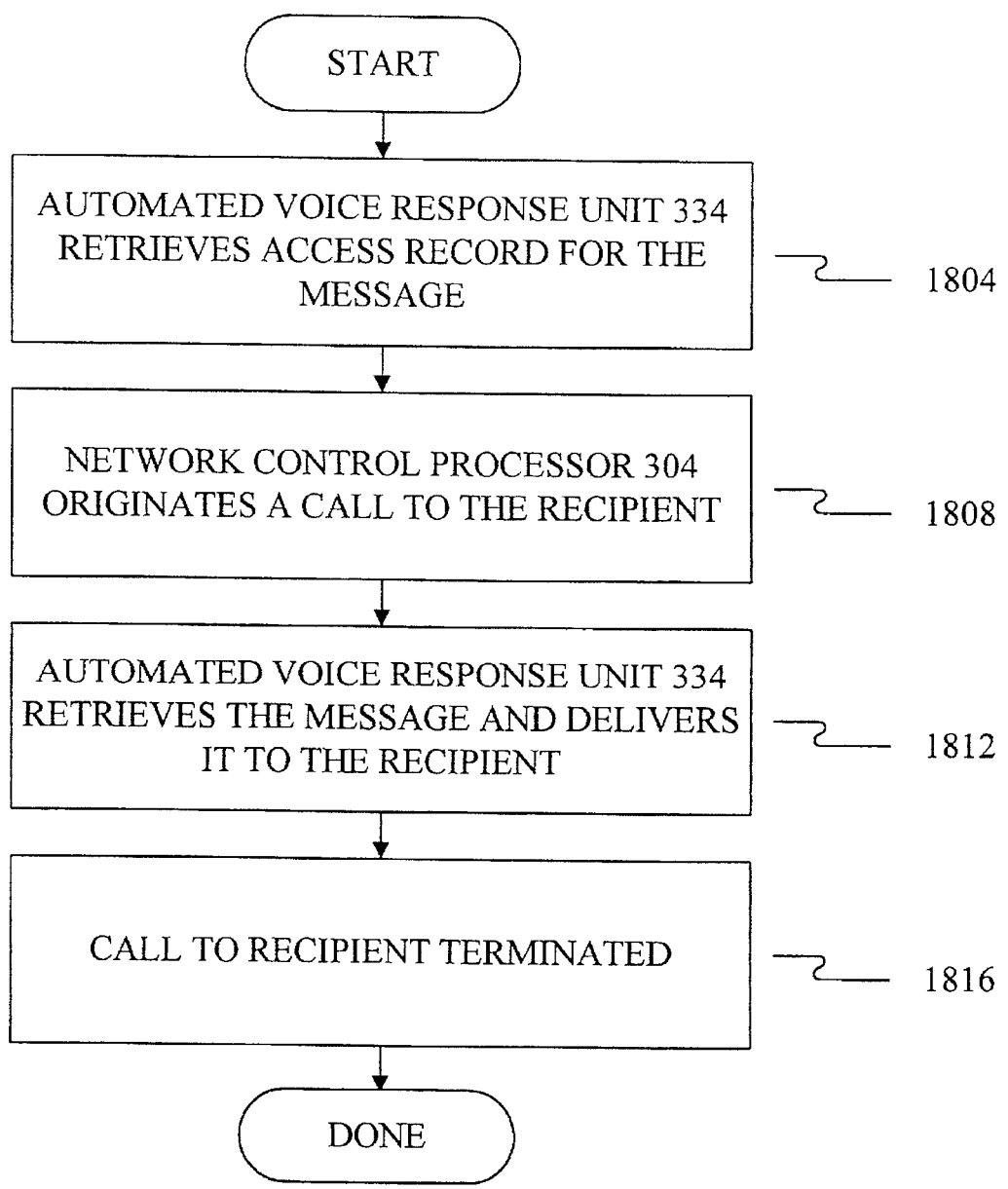
FIG. 18 is an operational flow diagram illustrating a method by which the message delivery service retrieves and delivers the message to a user.
Figure 20:
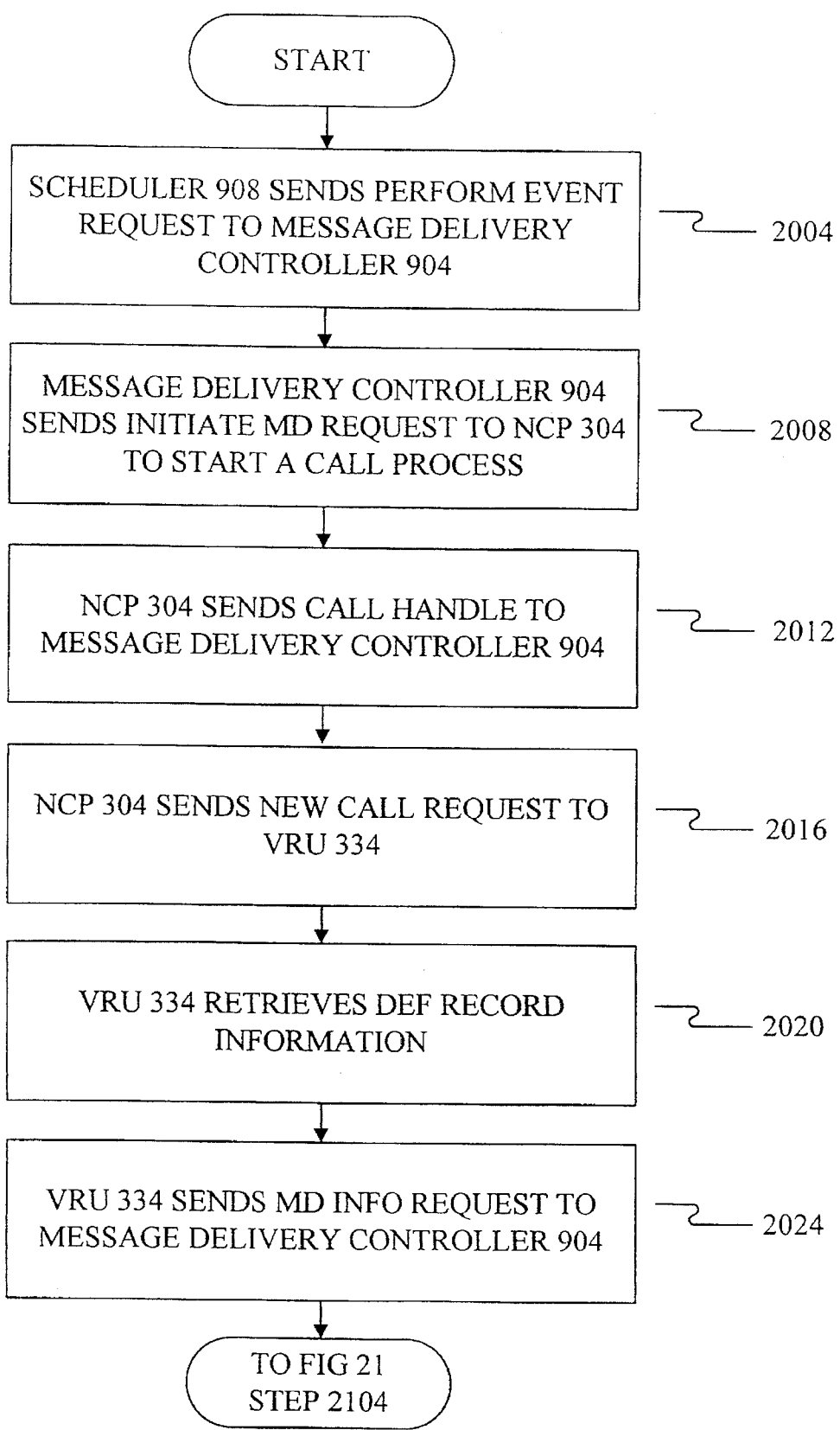
FIGS. 20, 21, 22, 23, and 24, is an operational flow diagram illustrating a process of message delivery according to one embodiment of the invention.
Figure 21:
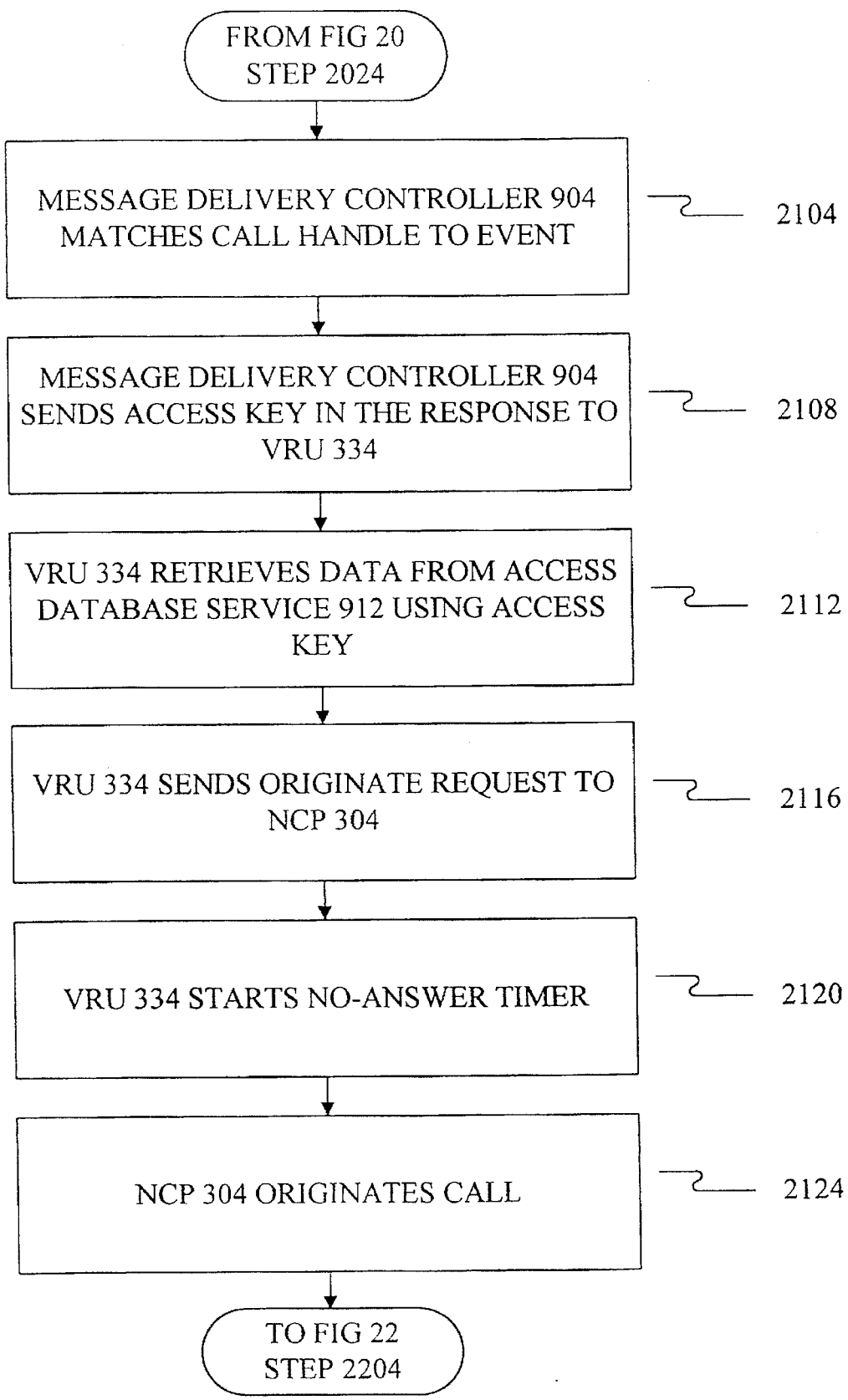

FIG. 18 is an operational flow diagram illustrating a method by which message delivery service 900 retrieves and delivers the message to user 106B. In a step 1804, automated voice response unit 334 retrieves access data from access database 914 pertaining to the message to be delivered. In a step 1808, network control processor 304 originates a call to the user 106B that is to receive the message.

In a step 1812, automated voice response unit 334 retrieves the message from message database 918 and delivers the message data to the user 106B via matrix switch 308. In a step 1816, the call to user 106B is terminated after the message is delivered.

Steps 1608 and 1612 of FIG. 16 have thus been described in greater detail with reference to FIGS. 17 and 18, respectively. The entire process of message delivery is now described in still greater detail according to one embodiment of the invention. This description is made with reference to FIG. 19, which comprises FIGS. 20, 21, 22, 23, and 24.

In a step 2004, scheduler 908 determines that it is time to deliver a message to user 106B. This determination is made by the NEXT EVENT TIME expiring as described above. When it is time to deliver a message, scheduler 908 notifies message delivery controller 904 that a message is to be delivered to user 106B. In one embodiment, this is accomplished by sending a PERFORM EVENT REQUEST message to message delivery controller 904.

The PERFORM EVENT REQUEST contains the information the message delivery controller sent to the scheduler in the MAKE EVENT REQUEST. This information can include base billing information, an access key, operator console allocation and scheduling information and scheduler ID. An example of the information contained in the PERFORM EVENT REQUEST message is illustrated in Table 6 according to one embodiment of the invention.

TABLE 6

| PERFORM EVENT REQUEST |
| --- |
| Base Billing Information |
| Access Key |
| Operator Console Allocation Information |
|    DEF Number |
|    NCP Call Type |
|    Language |
|    Device Type |
| Scheduling Information |
|    Maximum Attempts |
|    Default Minutes |
|    Current Attempt |
|    Array of Attempt Times |
| Scheduler ID |

When a PERFORM EVENT REQUEST is received from scheduler 908, delivery of the message is attempted. For each delivery attempt, the message delivery controller 904 creates a "procedure instance." A procedure instances is a portion of the message delivery controller program that performs a specific task and is identified by a unique procedure ID. In an event-driven program such as one embodiment of message delivery controller 904, multiple procedure instances may exist simultaneously—each processing a unique message delivery attempt. Therefore, the procedure ID identifies a single procedure instance for a single delivery attempt.

When the procedure instance is created, the procedure instance routine adds the procedure ID and the scheduler ID from the PERFORM EVENT REQUEST to a scheduler ID list in message delivery controller 904.

For each new attempt to deliver the message, the message delivery controller checks the scheduler ID list for the presence of the scheduler ID associated with the current message. If the scheduler ID for the message already exists in the scheduler ID list, no new procedure instance is created for a delivery attempt. This is because the presence of the scheduler ID on the list indicates the message delivery process is in progress.

Along with tracking events, scheduler 908 performs polling of the message delivery controller 904. This is a precautionary action. If the message delivery system 902 or any of its related systems, such as network control processor 304 or automated voice response unit 334, have an interruption in service, it is possible that the PERFORM EVENT REQUEST, which includes the scheduler ID, could be lost.

The message delivery controller 904 would be unaware that a timer had expired and an event was to be performed. To safeguard against this possibility, scheduler 908 periodically resends the PERFORM EVENT REQUEST to the message delivery controller 904 at an interval specified in the polling time. If the message delivery controller 904 has the PERFORM EVENT REQUEST, it responds to indicate that the scheduler ID is on the scheduler ID list. If the scheduler ID is not on the list, message delivery controller 904 adds it to the list.

If the system is already busy with a configurable number of requests, message delivery controller 904 returns a "BACK OFF" RESPONSE to scheduler 908. This command tells scheduler 908 to increase the time between polling requests.

In a step 2008, message delivery controller 904 notifies network control processor 304 that it is time to initiate message delivery. In one embodiment, this is accomplished by the procedure instance sending an INITIATE MESSAGE DELIVERY (MD) REQUEST to network control processor 304. This request preferably contains a DEF number, a network control processor call type, billing information, a language type, and device type array. The DEF number is used by automated voice response unit 334 to retrieve a DEF record from DEF service 932, indicating how to handle the message delivery in this particular instance.

As discussed above in Section 1.2, the language field is used to specify a language, and the device type array specifies the type of device required, such as an automated voice response unit 334 or facsimile device. Note that in this embodiment, a new call is generated within network control processor 304, rather than in matrix switch 308. An example of the INITIATE MD REQUEST is illustrated in Table 7 according to one embodiment of the invention.

TABLE 7

| INITIATE MD REQUEST |
| --- |
| Base Billing Information |
| Operator Console Allocation Information |
| DEF Number |
| NCP Call Type |
| Language |
| Device Type |

In a step 2012, network control processor 304 sends a call handle to message delivery controller 904. The call handle contained in the response to the INITIATE MD REQUEST is placed in the scheduler ID list by message delivery controller 904. The call handle is a unique call identifier that ties message delivery controller 904 with network control processor 304. The call handle is used to relate a particular call setup in network control processor 304 with a specific message attempt, as several message deliveries can be taking place at the same time.

The scheduler ID is the key that uniquely identifies the event within scheduler 908 and message delivery controller 904. The message key is the connection between the access database service 912 and the message database service 916.

Each key is designed for a particular service, but can be distributed to more than one service to facilitate troubleshooting. Keys can then be matched to trace a call process. Another reason that keys are distributed to other services is so they are already available if they are needed for a new portion of the process or for maintenance. In message delivery, the scheduler ID is common between scheduler 908, message delivery controller 904, automated voice response unit 334 and the access record.

The procedure instance stores the call handle and the procedure ID in a call handle list. In this manner, the scheduler ID and call handle can be matched for a particular message delivery by matching the procedure ID.

In a step 2016, network control processor 304 notifies automated voice response unit 334 that the message is to be delivered. This enables the automated voice response unit 334 to set up for message delivery. In one embodiment, this is accomplished by sending a NEW CALL REQUEST to automated voice response unit 334. The NEW CALL REQUEST includes the call handle assigned by the network control processor 304, operator console allocation information including the DEF number, and other information pertaining to the call. An example of the information contained in the NEW CALL REQUEST according to one embodiment of the invention is illustrated in Table 8.

TABLE 8

| NEW CALL REQUEST |
| --- |
| Call Handle |
| Other Call Processing Information |
| Operator Console Allocation Information |
| DEF Number |
| NCP Call Type |
| Language |
| Device Type |

In a step 2020, automated voice response unit 334 uses the DEF number sent by network control processor 304 to retrieve a DEF record from DEF service 932. The DEF record contains complete instructions regarding how to process the message delivery. The DEF record can be established based on user 106, subscriber 114, or customer 110 information. As a result, the DEF record can contain instructions that are unique, or customized, at the user and/or customer level. Thus, through the use of DEF service 932, message delivery can be customized for various users and/or customers.

If there are no processes available within automated voice response unit 334 to handle the request, network control processor 304 queues the request until an automated process is available. If the allotted time in the queue is exceeded, message delivery controller 904 cancels the request to the network control processor 304 to remove the queued request. As a result, the message is not delivered. Note that in this situation, a field indicating the number of attempts for message delivery is not increased to reflect this "attempted delivery."

In a step 2024, the automated voice response unit 334 requests information about the message from the message delivery controller 904. This request includes the call handle, which uniquely identifies the call to message delivery controller 904. Message delivery controller 904 looks in the call handle list for the call handle. When message delivery controller 904 finds the call handle, it sends the MESSAGE DELIVERY (MD) INFO REQUEST to the procedure that registered the call handle. In this manner, message delivery controller 904 can determine the message for which automated voice response unit 334 is requesting information. As a result, message delivery system 902 can handle multiple simultaneous message deliveries by one or more automated voice response units 334.

In a step 2108, message delivery controller 904 returns the access key for the message delivery to the automated voice response unit 334. Using the access key, automated voice response unit 334 retrieves the access record for the message delivery from access database 914. The retrieved access record contains the destination telephone number, the time the message was recorded, length of the message, one or more message keys, the scheduler ID and a blank time-delivered field. This is accomplished in a step 2112.

In a step 2116, the automated voice response unit 334 requests that network control processor 304 originate a call to the message recipient, user 106B. This request includes the destination telephone number that automated voice response unit 334 obtained from the access record in step 2112. This request includes the call handle to identify the call as well as other call processing information.

In a step 2120, automated voice response unit 334 starts a timer that measures the amount of time elapsed until the call is answered by user 106B. A timer limit is set such that if the timer meets this limit (preferably specified in seconds), the call is released. The NO ANSWER TIMER limits the time a device (e.g., telephone, modem, fax machine, etc.) can "ring" before message delivery service 900 disconnects the call attempt.

In a step 2124, network control processor 304 originates a call to user 106B so the message can be delivered. Once the call is originated, a call can be either answered or unanswered. The scenario illustrated in FIG. 22 assumes that the call is answered and a connection established. Thus, in a step 2204, network control processor 304 informs automated voice response unit 334 that user 106B has answered the call. In one embodiment, this is accomplished by sending an ANSWER REQUEST message to automated voice response unit 334. In steps 2208 and 2212, automated voice response unit 334 marks the message delivery status as "delivered" and prompts user 106B for input regarding message delivery. In one embodiment, this prompting is accomplished by playing a voice script accessed from a voice script service as described in the co-pending patent application titled "Distributed Voice System And Method" as referenced above.

In a step 2216, automated voice response unit 334 retrieves the message from message database service 916 and, in a step 2220, delivers this message to user 106B. In one embodiment, the message is stored in and retrieved from message database service 916 as described in the co-pending patent application titled "Distributed Voice System And Method" as referenced above. It should be noted that the message could be of any type including, but not limited to, a facsimile message, a data message, or a voice message. In one embodiment, the message is stored in message database 918 in a digitized format.

In voice message delivery, information delivered along with the message can include but is not limited to sender name, recipient name, and the actual recorded message.

Once the message has been delivered, in a step 2224, automated voice response unit 334 informs network control processor 304 that the call to the called party can be released. Also, in a step 2228, automated voice response unit 334 notifies message delivery controller 904 via a MESSAGE DELIVERY (MD) COMPLETE REQUEST that the message has been delivered. The message is identified by the call handle assigned to the call and sent in the MESSAGE DELIVERY (MD) COMPLETE REQUEST and is passed to the message delivery controller in step 2012. It should be noted that if the delivery attempt is unsuccessful, in one embodiment, automated voice response unit 334 notifies message delivery controller 904 that the message was not delivered.

In a step 2304, message delivery controller 904 checks to determine whether the message is delivered. In one embodiment, this is accomplished by checking a status field that indicates whether the message has been delivered. If the message has been delivered, in a step 2308, message delivery controller 904 informs automated voice response unit 334 that the message can be deleted. In one embodiment, this is accomplished by setting a delete flag indicating that data pertaining to the particular message delivery may be deleted and by returning this delete flag to automated voice response unit 334. When automated voice response unit 334 receives and checks the delete flag in step 2312, it sends a DELETE DATA REQUEST to message database service 916 and access database service 912 to delete the associated records from message database 918 and access database 914. This is accomplished in step 2316. At the same time, message delivery controller 904 sends a REMOVE EVENT REQUEST to scheduler 908. This contains the scheduler ID. Scheduler 908 removes the record from scheduler database 910.

Note that in this embodiment, the responsibility for storing, retrieving, and deleting records from message database 918 and access database 914 is delegated to automated voice response unit 334. This is done because the automated voice response unit 334, using distributed voice, created the message and access record. Therefore, the automated voice response unit 334 deletes the records.

Figure 22:
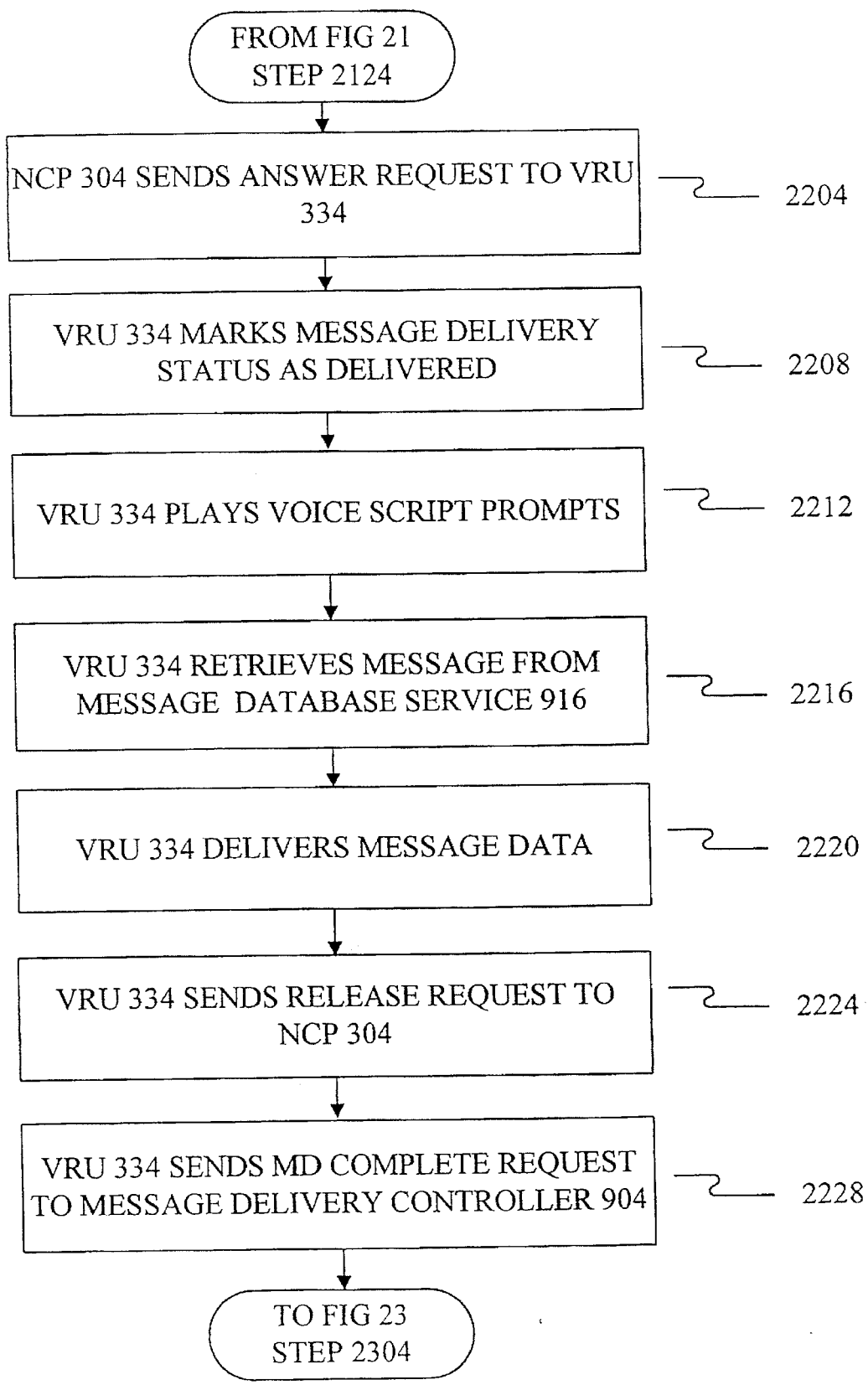
Figure 23:
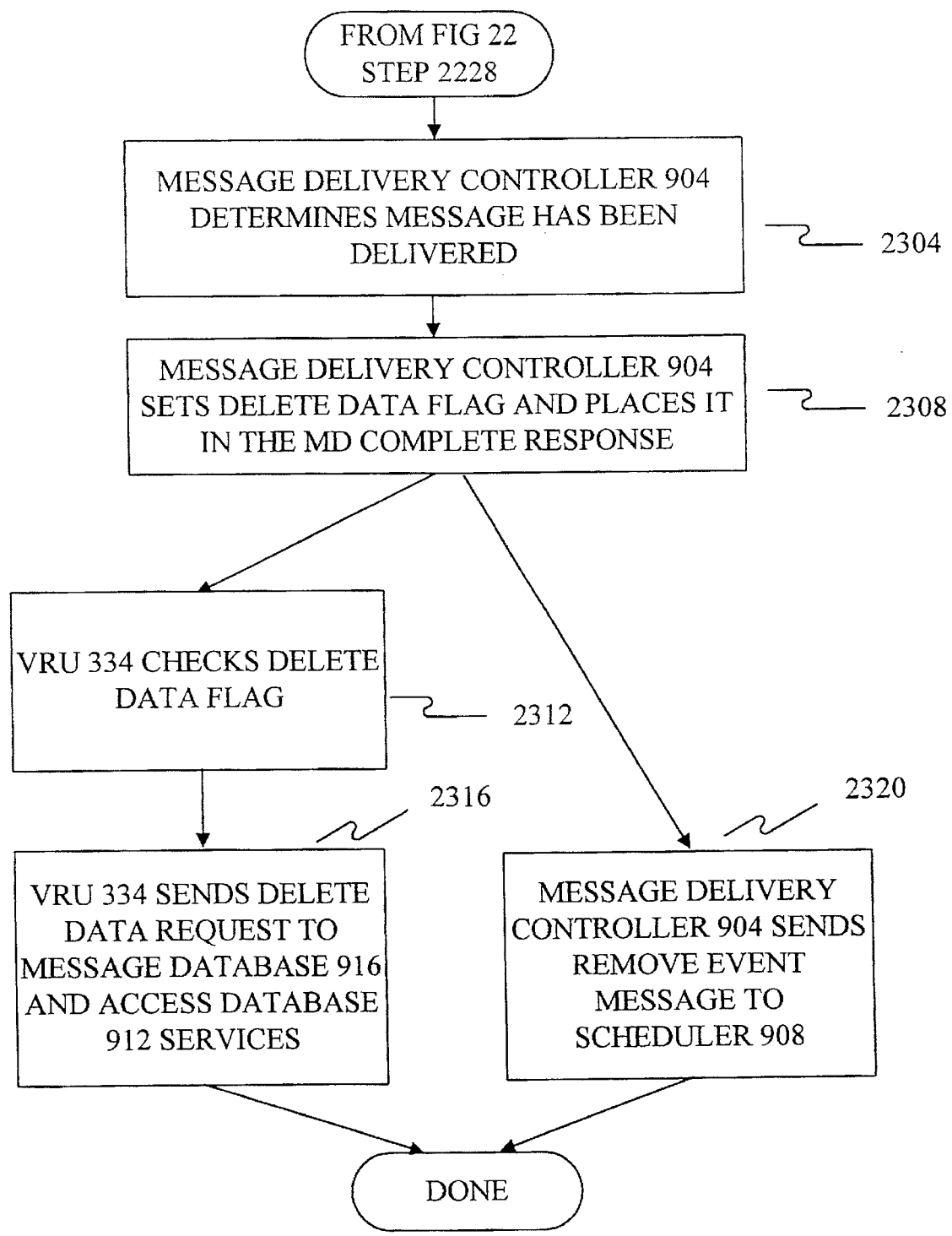

As discussed above with reference to FIG. 22, there are two scenarios: the call is answered or the call is not answered. FIGS. 22 and 23 are discussed in terms of the scenario where the call is answered. If, on the other hand, the call is not answered, at least two additional scenarios are possible: (1) the line is busy, or (2) the called party does not pick up the telephone. In either case, automated voice response unit 334 informs message delivery controller 904 that the message was not delivered.

In a step 2408, if the line is busy, network control processor 304 sends a terminate message to automated voice response unit 334. In one embodiment, a common channel signalling system 7 (SS7) out-of-band signalling channel can be used to determine whether the line is busy. Alternatively, if in a step 2412, there is no answer or the signalling channel is in-band and therefore cannot distinguish between a "no answer" and a busy signal, the answer timer times out. The automated voice response unit 334 requests that network control processor 304 release the call.

Figure 28:
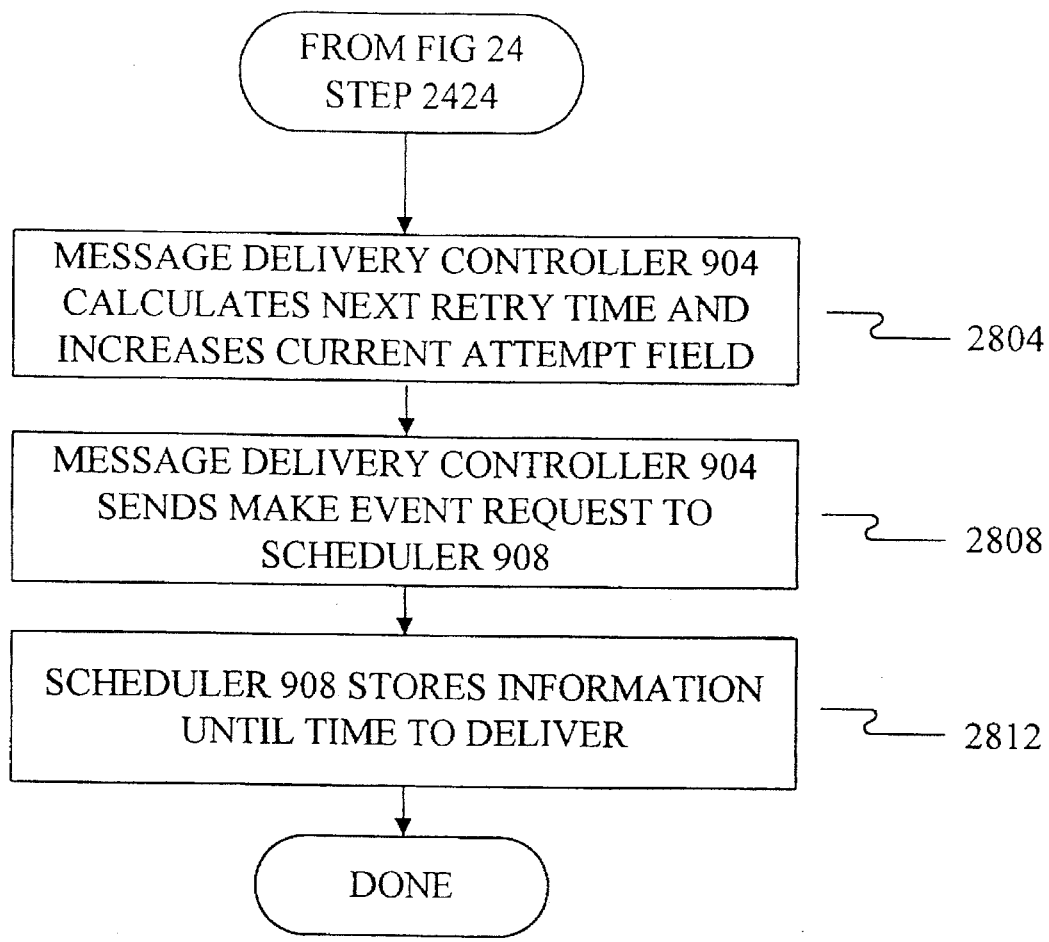
FIG. 28 is an operational flow diagram illustrating the steps followed when a retry attempt is scheduled.
Figure 29:
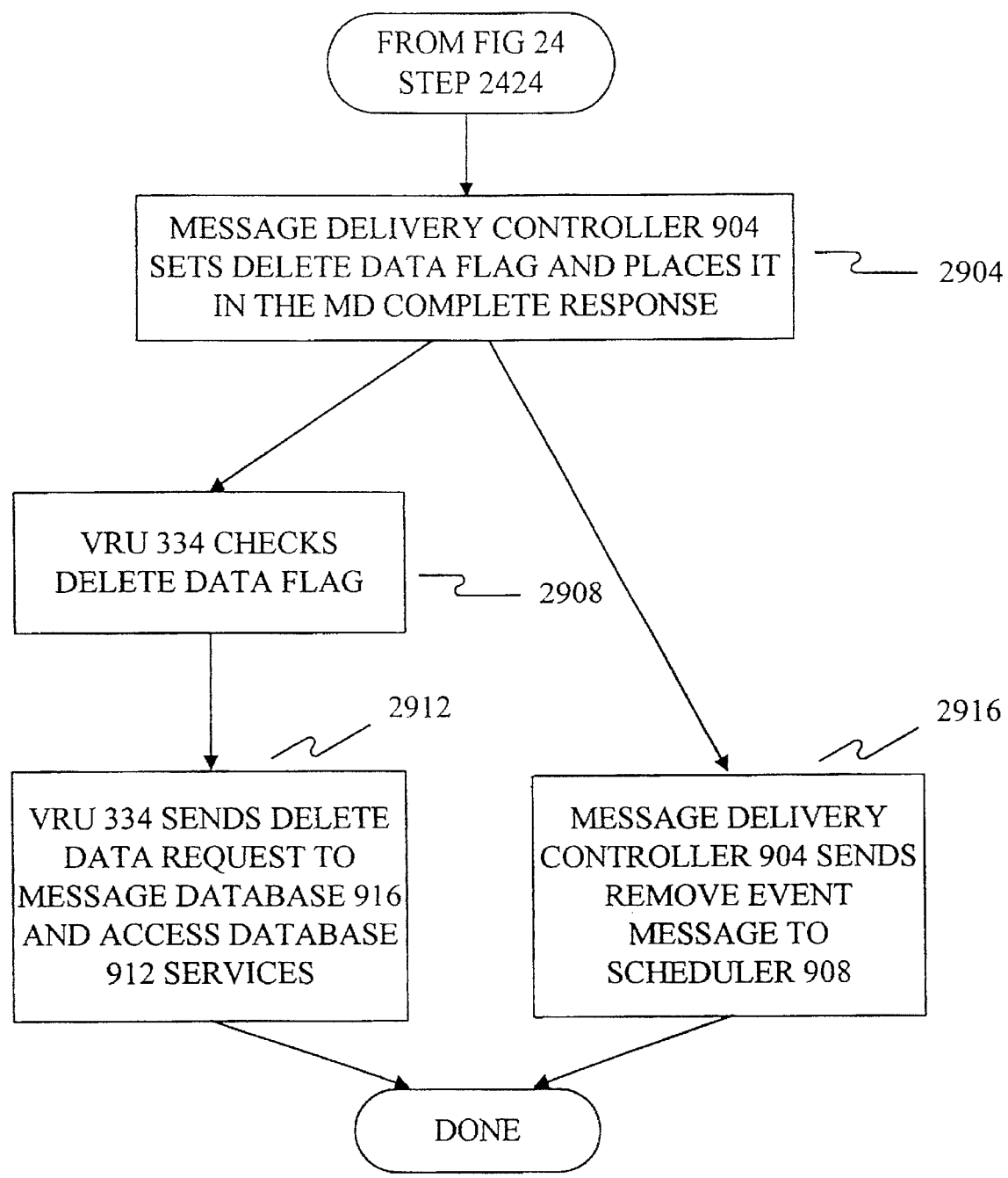
FIG. 29 is an operational flow diagram illustrating the process that occurs when a message is not delivered and no retry attempts remain.

In both cases, in a step 2416, automated voice response unit 334 informs the message delivery controller 904 that the call was not completed, and thus the message was not delivered. In a step 2420, message delivery controller 904 checks the number of remaining delivery attempts to determine whether additional attempts are to be made. If additional attempts remain, the operation continues as illustrated in FIG. 28. If there are no additional retry attempts remaining, the operation continues as illustrated in FIG. 29. FIGS. 28 and 29 are discussed in detail below.

FIG. 25 is a block diagram illustrating a scheduling information structure used to determine the strategy for message delivery according to one embodiment. Scheduling information in the scheduling information structure 2500 includes maximum attempts field 2504, default minutes field 2508, current attempt field 2512, and an array of attempt times field 2516. The maximum attempts field 2504 indicates a total number of attempts that will be permitted to deliver the message. If the message cannot be delivered in this number of attempts, the message is marked as not delivered and the message information is deleted.

Default minutes field 2508 indicates the number of minutes that message delivery service 900 waits between delivery attempts if there is not a value in the field for array of attempt times 2516. The default minutes field 2508 is used to determine the next delivery time.

The current attempt field 2512 is the number of attempts made to deliver the message. Each time an attempt is made, this field is incremented by one. This current attempt field 2512 also serves as an index to the array of attempt times field 2516.

The array of attempt times field 2516 has two components. These two components are a size field 2520 and the elements field 2524. Size field 2520 indicates the number of elements 2524 in the array. Thus, if the size of the army is zero, there are no elements 2524 in the array. Similarly, if the size of the array is three, there are three elements 2524 in the array.

Each element 2524 in the army is a guide to the number of minutes between attempts for a specific retry attempt. For example, if the value of the current attempt field 2512 is two, representing the second attempt, the array of attempt times field 2516 accessed would be that element 2524 corresponding to the second attempt—minutes attempt '2' 2524B. The number of minutes to delay the delivery for the minutes attempt '2' 2524B could be any number, such as 20 minutes. Each minutes attempt element 2524 could be different from the others, thus specifying different amounts of delay between attempts.

Automated voice response unit 334 provides the next attempt time information 2600: delivery status 2604, time type 2608, and time value 2612. These variables are illustrated in FIG. 26. Delivery status 2604 could be delivered 2604A or not delivered 2604B.

Time type 2608 could be not specified type 2608A, actual time type 2608B, or a minute offset type 2608C specifying 'N' number of minutes. The not specified type 2608A uses scheduling information when a time has not been entered by user 106A. The actual time type 2608B refers to an hour and minute entry placed by user 106A specifying the time delivery is to be made. The minute offset type 2608C specifies a specific number of minutes from the time the message is recorded. For example, a 15 minute offset means that the message delivery attempt could begin 15 minutes from the time message recording was completed.

The time value variables 2612 include a future date and time variable 2612A and a current date and time plus N minutes variable 2612B. If the actual time type 2608B is selected by user 106A by entering a specific date and time, future date and time variable 2612A is used. If the time type variable 2608 selected by user 106A is minute offset type 2608C, current date and time plus N minutes variable 2612B is used, where N represents the number of minutes that the delivery is offset from the recording time.

Figure 27:
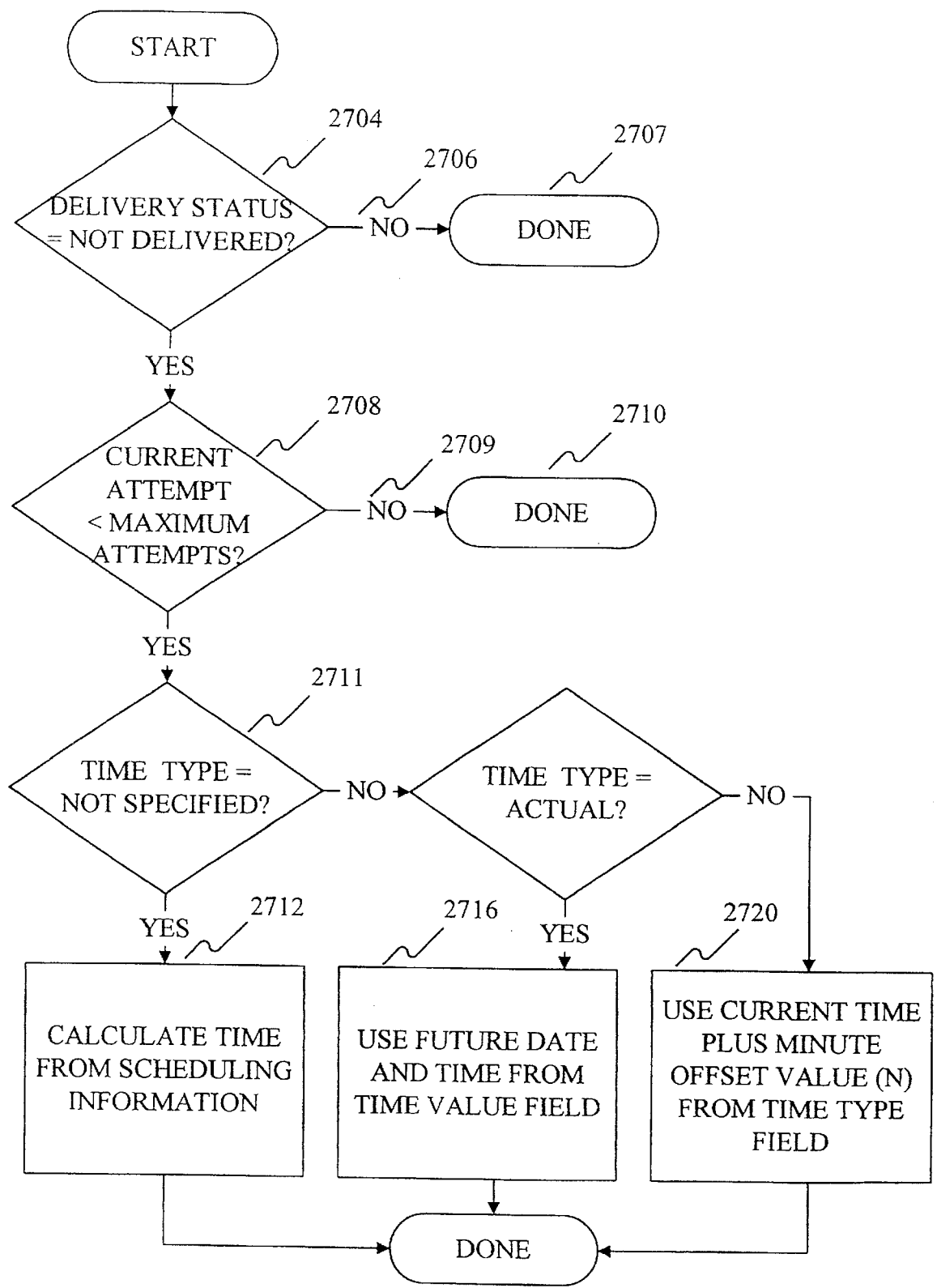
FIG. 27 is an operational flow diagram illustrating a process by which the next attempt time calculation is made according to one embodiment of the invention.

These variables illustrated in FIGS. 25 and 26 are used to make the next attempt time calculation by message delivery controller 904. The process by which this is accomplished according to one embodiment is illustrated in FIG. 27.

In a step 2704, if the delivery status equals 'not delivered,' the time for the next delivery attempt may need to be calculated. If, on the other hand, the message is delivered, no calculation needs to be performed as illustrated by flow line 2706 and done step 2707.

If the message is not delivered as determined in step 2704, message delivery controller 904 next determines whether the current attempt is less than the maximum number of attempts specified. This is done by comparing current attempt field 2512 with the maximum attempts 2504 specified. If the current number of attempts meets the maximum, the calculation need not be performed, as no more attempts are to be made. This is illustrated by flow line 2709 and done block 2710.

If the message is not delivered and the maximum number of attempts is not met, message delivery controller 904 determines the time at which the next delivery attempt should be made. If, in step 2711, the time type variable 2608 is the not specified type 2608A, the time is calculated in a step 2712 from scheduling information. If the time type variable is the actual time type 2608B, message delivery controller 904 uses the future date and time specified in future date and time variable 2612A.

If, instead, minute offset type 2608C is specified, message delivery controller 904 uses the current date and time plus the offset value N in minutes from time value variable 2612B to calculate a new delivery time. This offset value is entered by user 106A when the message delivery is being set up.

Figure 24:
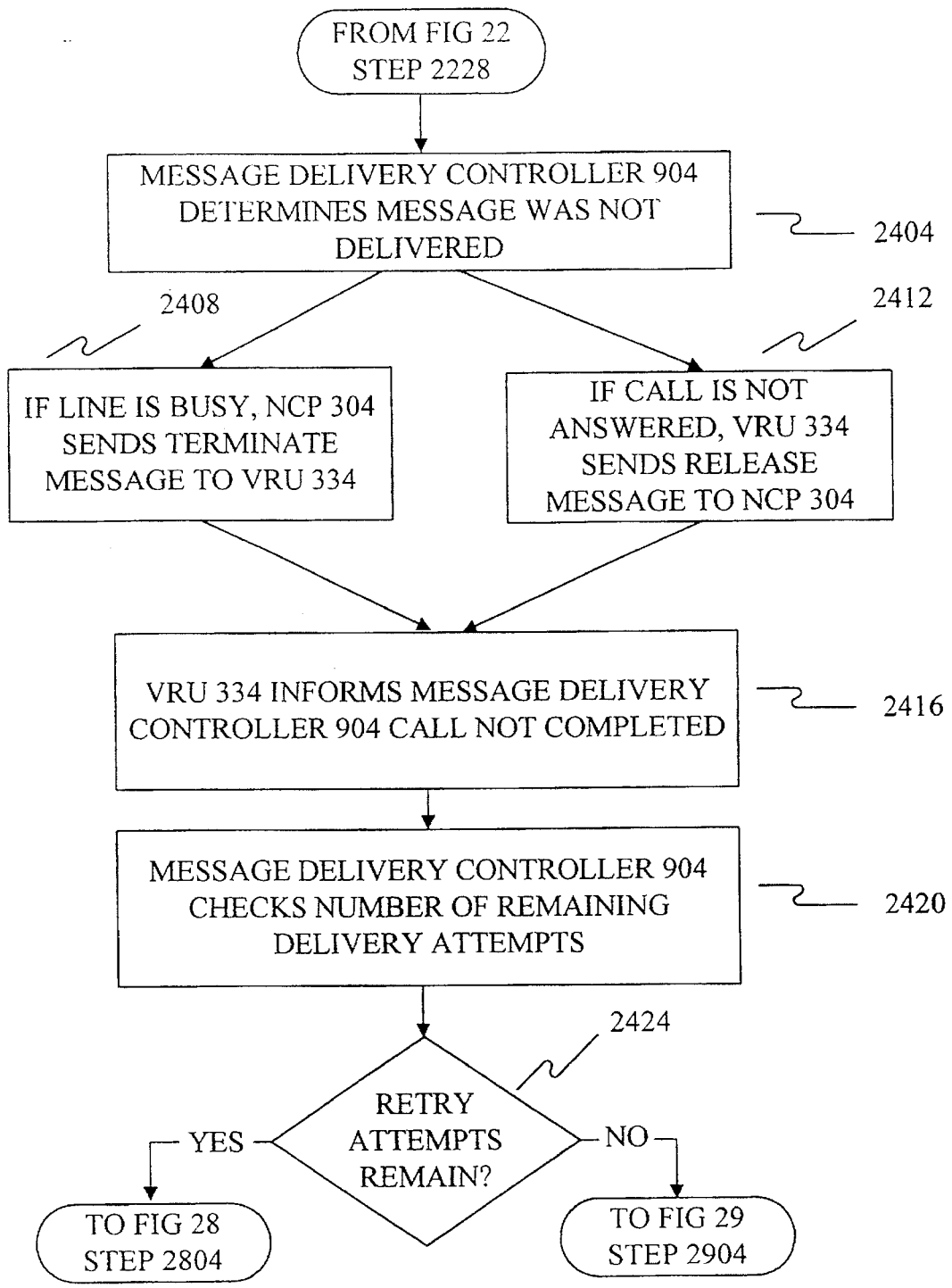

As stated above with reference to FIG. 24, if the message is undelivered and retry attempts remain, the operation continues as illustrated in FIG. 28. FIG. 28 is an operational flow diagram illustrating the steps followed when a retry attempt is scheduled. As stated above with reference to FIG. 24, in a step 2424, message delivery controller 904 determines whether additional retry attempts remain. The manner in which message delivery controller 904 determines whether additional retry attempts remain (step 2424) is by comparing the maximum attempts field 2504 with the current attempt field 2512. If the current attempt field 2512 equals maximum attempts field 2504, no retry attempts remain.

In a step 2804, message delivery controller 904 determines the time at which the next delivery attempt is to be made and increases the current attempt field 2512. In a step 2808, message delivery controller 904 instructs scheduler 908 to reschedule the delivery attempt. The same scheduler ID is used, but the new record replaces the old record containing the previous delivery time. In a step 2812, scheduler 908 stores the new MAKE EVENT REQUEST in scheduler database 910 so that a retry attempt can be initiated at the scheduled time.

The message delivery controller 904 sends a MAKE EVENT REQUEST to the scheduler 908 using the new scheduled time. The procedure instance cleans up the previous attempt by removing the scheduler ID and call handle from their respective lists. Then the procedure instance is eliminated.

When it is time for the next delivery attempt for this message, message delivery controller 904 does not find the scheduler ID on the scheduler ID list. Therefore, message delivery controller 904 adds a scheduler ID to the list for the current attempt.

In addition, the call handle will be different from the call handle assigned to the first attempt. A call handle only can be added to the call handle list when a response to the INITIATE MESSAGE DELIVERY (MD) REQUEST is received.

The call handle list serves as protection against aborted delivery attempts caused by system failure. If the attempt to set up a message delivery is unsuccessful due to a system failure, the procedure instance removes the scheduler ID and the call handle from their respective lists, and then the procedure instance is eliminated. Each time the scheduler sends a PERFORM EVENT REQUEST, a new procedure instance is created and the process defined previously repeats.

The call handle list also serves to clean up incomplete calls, as illustrated in the following example. Assuming no automated voice response unit 334 is available to handle a NEW CALL REQUEST from the network control processor 304, the call is queued and eventually times out.

In this scenario, the message delivery controller 904 sends a RELEASE REQUEST to network control processor 304 to release the call. Message delivery controller 904 also removes the call handle from the call handle list.

Network control processor 304 could be in the process of dequeuing the call when the RELEASE REQUEST is sent by message delivery controller 904. One step in dequeuing a call is sending a NEW CALL REQUEST to automated voice response unit 334. It is possible that automated voice response unit 334 receives the NEW CALL REQUEST before the RELEASE REQUEST is processed by network control processor 304. The NEW CALL REQUEST prompts automated voice response unit 334 to send a MESSAGE DELIVERY (MD) INFO REQUEST to message delivery controller 904. Message delivery controller 904 then checks the call handle list for this call and does not find the call handle, since it has already been removed by the RELEASE REQUEST.

Message delivery controller 904 returns an error to the process that sent the MESSAGE DELIVERY (MD) INFO REQUEST, in this case automated voice response unit 334, indicating that the call handle was not found. The automated voice response unit 334 cleans up its portion of the unnecessary call and is ready for another call.

FIG. 29 is an operational flow diagram illustrating the process that occurs when a message is not delivered and no retry attempts remain. In a step 2904, message delivery controller 904 sets a delete flag and sends this delete flag to automated voice response unit 334. In a step 2908, automated voice response unit 334 checks the delete data flag and deletes the data records from message database 918 and access database 914 for the message as illustrated in step 2912. In step 2916, at the same time, message delivery controller 904 sends a REMOVE EVENT REQUEST to scheduler 908. This contains the scheduler ID. Scheduler 908 removes the record from scheduler database 910.

3. Conclusion

While various embodiments of the present invention have been described above, it should be understood that they have been presented by way of example only, and not limitation. Thus, the breadth and scope of the present invention should not be limited by any of the above-described exemplary embodiments, but should be defined only in accordance with the following claims and their equivalents.

What is claimed is:

1. A method for recording and storing a message from a user for delivery to a recipient, comprising the steps of:
   (1) receiving and storing the message in a message database;
   (2) storing an access record corresponding to said stored message, wherein said access record comprises message delivery information;
   (3) sending a schedule event request to a message delivery system, said schedule event request including said message delivery information;
   (4) said message delivery system using said message delivery information to determine a time to initiate delivery of the message;
   (5) said message delivery system assigning a scheduler ID to uniquely identify said message delivery information for the message;
   (6) updating said access record to include said scheduler ID; and
   (7) storing a schedule event in a scheduler database, the schedule event indicating that the delivery of the message is to be initiated at said determined time.

2. The method of claim 1, wherein said step of receiving and storing the message comprises the steps of:
   prompting the user for the message and for said delivery information;
   storing the message in said message database; and
   storing said delivery information in an access database.

3. The method of claim 2, wherein said step of storing the message in said message database comprises the steps of:
   sending a first packet of the message to said message database;
   assigning a message key to said first packet; and
   sending remaining packets of the message to said message database using said message key.

4. The method of claim 2, wherein said step of storing the message in said message database comprises the steps of:
   an automated voice response unit sending a first packet of the message to a front-end distributor;
   said front-end distributor assigning a message key to said first packet and returning said message key to said automated voice response unit;
   said front-end distributor forwarding said first packet to a message database service for storage in said message database;
   said automated voice response unit sending remaining packets of the message to said front-end distributor using said message key;
   said front-end distributor forwarding said remaining packets to said message database service for storage with said first packet.

5. The method of claim 1, wherein
   said step (4) comprises the step of a message delivery controller determining said delivery time and providing a make event request indicating said message delivery time to a scheduler;
   wherein said step (5) comprises the step of said scheduler assigning a scheduler ID to uniquely identify said make event request for the message and providing said scheduler ID to said message delivery controller; and
   further comprising the step of said message delivery controller providing said scheduler ID to an automated voice response unit.

6. The method of claim 5, wherein said step (6) comprises the step of updating, by said audio response unit, said access record to include said scheduler ID.

7. The method of claim 1, further comprising the steps of:
   determining that it is time to deliver a scheduled message;
   retrieving said scheduled message from said message database;
   initiating a call to the recipient; and
   delivering said scheduled message to said recipient.

8. The method of claim 7, further comprising the step of deleting said scheduled message from said message database after said scheduled message is delivered to the recipient.

9. The method of claim 1, further comprising the steps of:
   at said determined time, a message delivery system instructs a network control processor to start delivery of the message to the recipient;
   said network control processor notifies said automated voice response unit that the message is to be delivered;
   said network control processor originates a call to the recipient and informs said automated voice response unit when the recipient answers said call;
   said automated voice response unit retrieves the message from said message database and initiates delivery of the message to the recipient.

10. The method of claim 9, further comprising the steps of:

said network control processor sending a call handle to said message delivery system and to said automated voice response unit, said call handle identifying the call in which the message delivery will be attempted;

said automated voice response unit receives said scheduling information from said message delivery system and a key identifying said access record stored for the message, said access record including a telephone number of the recipient; and said automated voice response unit retrieves said access record.

11. The method of claim 10, wherein said step of retrieving and initiating delivery of the message comprises the steps of:

said automated voice response unit providing said telephone number to said network control processor;

said network control processor originates a call to the recipient; and said automated voice response unit retrieves the message and delivers the message to the recipient when the recipient answers said call.

12. The method of claim 11, further comprising the steps of:

said automated voice response unit starting a timer that measures an amount of time elapsed until said call is answered;

said network control processor sending an answer message to said automated voice response unit indicating that said call is answered; and said automated voice response unit marking a delivery status as delivered when said call is answered.

13. The method of claim 11, further comprising the step of said automated voice response unit playing a voice script to the recipient to introduce the message.

14. The method of claim 11, further comprising the step of said automated voice response unit deleting said message from said message database after said message is delivered.

15. The method of claim 10, wherein said step of retrieving and initiating delivery of the message comprises the steps of:

said automated voice response unit providing said telephone number to said network control processor;

said network control processor originates a call to the recipient;

if the recipient does not answer or the line is busy, informing said automated voice response unit that the call is not completed; and said automated voice response unit informing said message delivery system that the call is not completed.

16. The method of claim 15, further comprising the steps of:

said message delivery system checking a number of retry attempts for the message;

if retry attempts remain for the message, said message delivery system calculating a next retry time and updating a current attempt counter; and said message delivery system updating a make event for the retry.

17. The method of claim 15, further comprising the steps of:

said message delivery system checking a number of retry attempts for the message;

if no retry attempts remain for the message, said message delivery system informing said automated voice response unit to delete the message and informing a scheduler to remove said schedule event from said scheduler database; and said automated voice response unit deleting the message.

18. A system for recording and storing a message from a user for delivery to a recipient, comprising:

means for storing the message in a message database;

means for storing an access record corresponding to said stored message, wherein said access record comprises message delivery information;

means for sending a schedule event request to a message delivery system, said schedule event request including said message delivery information;

means for determining a time to initiate delivery of the message using said message delivery information;

means for assigning a scheduler ID to uniquely identify said message delivery information for the message;

means for updating said access record to include said scheduler ID; and means for storing a schedule event in a scheduler database, the schedule event indicating that the delivery of the message is to be initiated at said determined time.

19. The system of claim 18, wherein said means for storing the message in a message database, comprises:

means for sending a first packet of the message to said message database;

means for assigning a message key to said first packet; and means for sending remaining packets of the message to said message database using said message key.

20. The system of claim 18, further comprising:

means for determining that it is time to deliver a scheduled message;

means for retrieving said scheduled message from said message database;

means for initiating a call to the recipient; and means for delivering said scheduled message to said recipient.

* * * * *